(12) United States Patent
Zhu

(10) Patent No.: US 8,920,931 B2
(45) Date of Patent: Dec. 30, 2014

(54) PHOSPHOSILOXANE RESINS, AND CURABLE SILICONE COMPOSITIONS, FREE-STANDING FILMS, AND LAMINATES COMPRISING THE PHOSPHOSILOXANE RESINS

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 40 days.

(21) Appl. No.: 13/817,647

(22) PCT Filed: Aug. 23, 2011

(86) PCT No.: PCT/US2011/048762
§ 371 (c)(1),
(2), (4) Date: Feb. 19, 2013

(87) PCT Pub. No.: WO2012/027337
PCT Pub. Date: Mar. 1, 2012

(65) Prior Publication Data
US 2013/0149520 A1    Jun. 13, 2013

Related U.S. Application Data

(60) Provisional application No. 61/376,034, filed on Aug. 23, 2010.

(51) Int. Cl.
| B32B 27/28 | (2006.01) |
| C08G 77/30 | (2006.01) |
| C08G 79/04 | (2006.01) |
| C08G 77/48 | (2006.01) |
| C08L 83/08 | (2006.01) |
| B32B 7/12 | (2006.01) |

(52) U.S. Cl.
CPC .............. *C08G 79/04* (2013.01); *C08G 77/30* (2013.01); *C08G 77/48* (2013.01); *C08L 83/08* (2013.01); *B32B 7/12* (2013.01); *B32B 27/283* (2013.01)
USPC .............. 428/447; 525/477; 528/15; 528/30; 528/31; 528/32; 528/398; 428/448; 524/588

(58) Field of Classification Search
None
See application file for complete search history.

(56) References Cited

U.S. PATENT DOCUMENTS

| 2,835,651 | A | 5/1958 | Gilbert et al. |
| 3,419,593 | A | 12/1968 | Willing |
| 4,087,585 | A | 5/1978 | Schulz |
| 4,093,641 | A | 6/1978 | Plueddemann |
| 4,766,176 | A | 8/1988 | Lee et al. |
| 4,766,192 | A | 8/1988 | Gvozdic |
| 5,017,654 | A | 5/1991 | Togashi et al. |
| 5,194,649 | A | 3/1993 | Okawa |
| 5,391,594 | A | 2/1995 | Romenesko et al. |
| 5,412,014 | A | 5/1995 | Romenesko |
| 5,443,744 | A | 8/1995 | Bloch et al. |
| 5,481,014 | A | 1/1996 | Graiver et al. |
| 5,627,296 | A | 5/1997 | Dauth et al. |
| 5,703,258 | A | 12/1997 | Blount |
| 5,710,300 | A | 1/1998 | Graiver et al. |
| 8,092,910 | B2 | 1/2012 | Bailey et al. |
| 8,277,939 | B2 | 10/2012 | Buether et al. |
| 8,277,945 | B2 | 10/2012 | Anderson et al. |
| 2007/0167563 | A1 | 7/2007 | Cray |
| 2009/0298980 | A1 | 12/2009 | Yoshitake et al. |
| 2010/0273011 | A1 | 10/2010 | Zhong et al. |
| 2010/0316876 | A1 | 12/2010 | Zhu |
| 2011/0021012 | A1* | 1/2011 | Leung et al. ................ 438/542 |
| 2011/0027584 | A1 | 2/2011 | Zhong et al. |
| 2012/0052309 | A1 | 3/2012 | Fairbank |

FOREIGN PATENT DOCUMENTS

| CN | 1847362 | 10/2006 |
| DE | 10257079 | 6/2004 |
| EP | 0720985 | 7/1996 |
| EP | 0982346 | 3/2000 |
| JP | 60-248732 | 12/1985 |
| JP | 61-278562 | 12/1986 |
| JP | 61-278564 | 12/1986 |
| JP | 63-132918 | 6/1988 |
| JP | H06-093104 | 4/1994 |
| JP | 2001-089572 | 4/2001 |

(Continued)

OTHER PUBLICATIONS

Kumar, S. A. "Synthesis and Thermal Characterization of Phosphorus Containing Siliconized Epoxy Resins." European Polymer Journal. vol. 42, No. 10, Oct. 2006, pp. 2419-2429 (11 pages).

(Continued)

*Primary Examiner* — Marc Zimmer
(74) *Attorney, Agent, or Firm* — Nixon Peabody LLP

(57) ABSTRACT

A phosphosiloxane resin comprises a plurality of covalently bonded monomer units selected from phosphosiloxane units $SiR^2{}_3$—O—P(=O)(R$^1$)—(OR$^3$)$_q$(O$_{1/2}$—)$_p$ and organosiloxane units $R^2{}_m(OR^3)_n SiO_{(4-m-n)/2}$. $R^1$ and each $R^2$ are independently selected from the group consisting of hydrogen, $C_1$ to $C_{10}$ hydrocarbyl, and $C_1$ to $C_{10}$ hydrocarbylene; each $R^3$ is independently selected from the group consisting of hydrogen and $C_1$ to $C_{10}$ hydrocarbyl; p is 0 or 1; q=1−p; m is 0, 1, 2, 3, or 4; n is 0, 1, or 2; and m+n is 0, 1, 2, 3, or 4. Curable silicone compositions comprise a phosphosiloxane resin having greater than one silicon-bonded alkenyl group, an organosilicon compound having at least two silicon-bonded hydrogen atoms, and a hydrosilylation catalyst. Fiber-reinforced free-standing films may comprise fibers dispersed in a cured product of the silicone composition. Laminated substrates comprise at least one fiber-reinforced free-standing film.

14 Claims, 1 Drawing Sheet

(56) References Cited

FOREIGN PATENT DOCUMENTS

| | | | |
|---|---|---|---|
| WO | WO 99/27011 | * | 6/1999 |
| WO | 2006/088645 | | 8/2006 |
| WO | 2006/088646 | | 8/2006 |
| WO | 2007/018756 | | 2/2007 |
| WO | 2007/092032 | | 8/2007 |
| WO | 2007/132932 | | 11/2007 |
| WO | 2009/111190 | | 9/2009 |
| WO | 2009/111193 | | 9/2009 |
| WO | 2009/111196 | | 9/2009 |
| WO | 2009/111199 | | 9/2009 |

OTHER PUBLICATIONS

International Search Report and Written Opinion mailed Feb. 8, 2012 which issued in corresponding International Patent Application No. PCT/US2011/048762 (15 pages).

* cited by examiner

PHOSPHOSILOXANE RESINS, AND CURABLE SILICONE COMPOSITIONS, FREE-STANDING FILMS, AND LAMINATES COMPRISING THE PHOSPHOSILOXANE RESINS

CROSS-REFERENCE TO RELATED APPLICATIONS

This application is a U.S. National Stage of International Application No. PCT/US2011/048762, filed Aug. 23, 2011, which claims the benefit of U.S. Provisional Application No. 61/376,034, filed Aug. 23, 2010 each of which are hereby incorporated by reference herein in their entireties.

TECHNICAL FIELD

The present disclosure relates generally to phosphosiloxane resins, which are silicone resins comprising phosphosiloxane monomer units. In particular, the present disclosure relates to phosphosiloxane resins, to curable silicone compositions comprising the phosphosiloxane resins, and to free-standing fiber-reinforced films and laminated substrates derived from cured products of the curable silicone compositions.

BACKGROUND

Silicone resins are useful in a variety of applications by virtue of their unique combination of properties, including high thermal stability, good moisture resistance, high oxidation resistance, low dielectric constant, and high transparency. For example, silicone resins are widely used as protective or dielectric coatings in the automotive, electronic, construction, appliance, and aerospace industries.

Although silicone-resin coatings can be used to protect, insulate, or bond a variety of substrates, free-standing silicone-resin films can have limited utility, owing to low tear strength, high brittleness, low glass transition temperature, and high coefficient of thermal expansion. Consequently, there is a need for free standing silicone resin films having improved mechanical and thermal properties.

To obtain transparent reinforced silicone resin films for applications such as fire-rated glass, for example, the refractive index of the silicone resin is kept relatively high. High refractive index can be obtained by introducing a high phenyl content into the silicone resin. But increases of phenyl content disadvantageously can also increase flammability of the silicone resin. As such, there remains a need for silicone resin compositions having suitable refractive indices and also decreased flammability. Decreased flammability in this regard may be quantified through measurements of limiting-oxygen index (LOI) of the silicone resin.

SUMMARY

The needs for high refractive-index and low-flammability silicone resins are met by the invention, as described in the example embodiments and preferred embodiments disclosed herein.

According to embodiments disclosed herein, a phosphosiloxane resin comprises a plurality of covalently bonded monomer units. Each covalently bonded monomer unit in the phosphosiloxane resin is selected from the group consisting of a phosphosiloxane unit having formula (I):

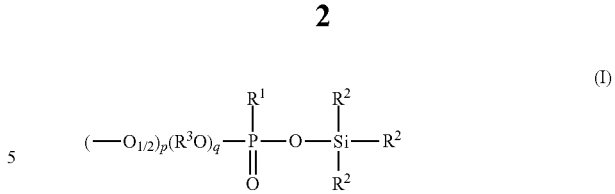

and an organosiloxane unit having formula (II):

In the formulas (I) and (II), $R^1$ and each $R^2$ are independently selected from the group consisting of hydrogen, $C_1$ to $C_{10}$ hydrocarbyl, and $C_1$ to $C_{10}$ hydrocarbylene; each $R^3$ is independently selected from the group consisting of hydrogen and $C_1$ to $C_{10}$ hydrocarbyl; p is 0 or 1; q=1−p; m is 0, 1, 2, 3, or 4; n is 0, 1, or 2; and m+n is 0, 1, 2, 3, or 4. In the phosphosiloxane resin, at least 0.001 mol. % of the covalently bonded monomer units are phosphosiloxane units. In each phosphosiloxane unit having q=1, at least one group $R^1$ or $R^2$ is $C_1$ to $C_{10}$ hydrocarbylene. Over all of the organosiloxane units present in the phosphosiloxane resin m has an average value of from 0.0001 to 3.95, and m+n has an average value of from 0.0001 to 3.95. In each organosiloxane unit having m+n=4, at least one group $R^2$ is $C_1$ to $C_{10}$ hydrocarbylene. In preferred embodiments, less than 75 mol. % of all groups $R^1$ and $R^2$ represented by all the phosphosiloxane units in the phosphosiloxane resin are hydrogen. In further preferred embodiments, less than 25 mol. % of all phosphosiloxane units in the phosphosiloxane resin have q=1. In still further preferred embodiments, less than 5 mol. % of all organosiloxane units have n>0.

According to further embodiments disclosed herein, a first curable silicone composition comprises (A) at least one phosphosiloxane resin according to the embodiments described above, wherein an average of greater than one group $R^1$ or $R^2$ per molecule of the at least one phosphosiloxane resin are alkenyl groups; (B) at least one organosilicon compound having an average of at least two silicon-bonded hydrogen atoms per molecule; and (C) a catalytic amount of a hydrosilylation catalyst.

According to still further embodiments disclosed herein, a second curable silicone composition comprises (A) at least one silicone resin having an average of at least two silicon-bonded alkenyl groups per molecule; (B) at least one organosilicon compound having an average of at least two silicon-bonded hydrogen atoms per molecule; (C) at least one phosphonate compound having formula (IV)

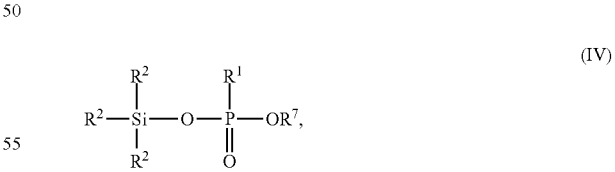

where $R^1$ and each $R^2$ are hydrogen or a $C_1$ to $C_{10}$ hydrocarbyl, $R^7$ is —$SiR^2{}_3$, hydrogen, or a $C_1$ to $C_{10}$ hydrocarbyl, such that at least one group $R^2$ per molecule of the at least one phosphonate compound is an alkenyl group; and (D) a catalytic amount of a hydrosilylation catalyst.

According to still further embodiments disclosed herein, a free-standing reinforced phosphosiloxane-resin film comprises a cured product of the first curable silicone composition or the second curable silicone composition. The free-standing reinforced phosphosiloxane resin film further comprises a fiber reinforcement dispersed in the cured product of the first curable silicone composition or the second curable silicone composition.

According to still further embodiments disclosed herein, a laminated substrate comprises a first substrate, at least one additional substrate overlying the first substrate, and a silicone adhesive. The silicone adhesive is provided on at least a portion of at least one surface of each substrate, such that at least a portion of the silicone adhesive is between opposing surfaces of every two adjacent substrates and is in direct contact with the opposing surfaces of the adjacent substrates, the silicone adhesive comprising a cured product of at least one silicone resin. The silicone adhesive may comprise an organosilicon compound, such as the organosilicon compound in the first curable silicone composition or the second curable silicone composition. At least one of the substrates in the laminated substrate is a free-standing reinforced phosphosiloxane-resin film.

These and other features, aspects, and advantages of the present invention will become better understood with reference to the following description, appended claims, and accompanying drawings.

BRIEF DESCRIPTION OF THE DRAWINGS

Though the specification concludes with claims particularly pointing out and distinctly claiming the invention, it is believed that the present invention will be better understood from the following description taken in conjunction with the accompanying drawings, in which:

DETAILED DESCRIPTION

Figure 1:
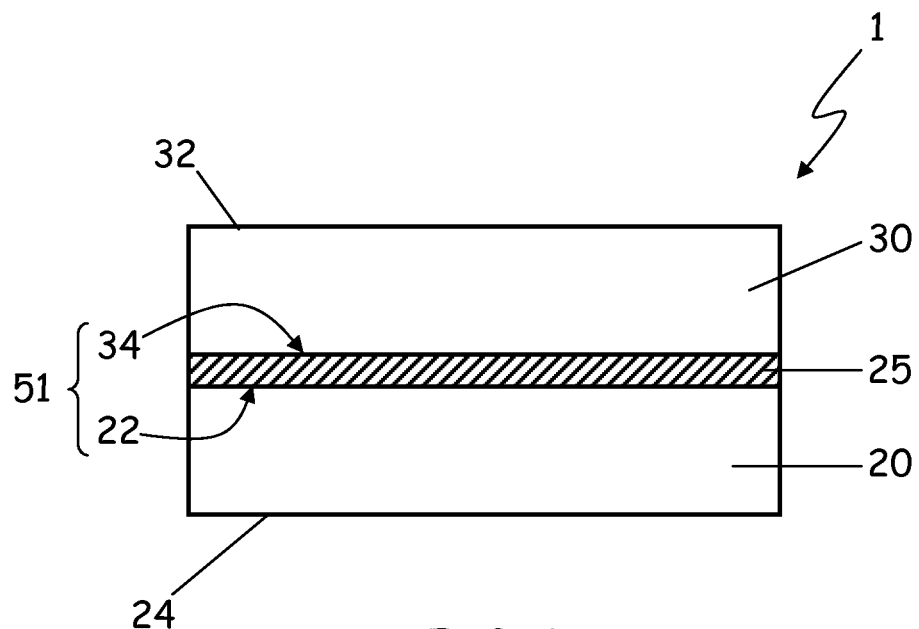
FIG. 1 shows a cross-sectional view of one embodiment of a laminated substrate comprising a first substrate and a first additional substrate.

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

As used herein, the term "hydrocarbyl" refers to a monovalent radical formed by removing any one hydrogen from a hydrocarbon molecule, where a "hydrocarbon molecule" is any molecule consisting of hydrogen atoms and carbon atoms. The term "hydrocarbyl" encompasses linear groups, branched groups, cyclic groups, and combinations thereof, wherein any two neighboring carbon atoms may be joined by a single bond, a double bond, or a triple bond. Thus, "hydrocarbyl" encompasses both saturated hydrocarbyls and unsaturated hydrocarbyls.

As used herein, the term "halohydrocarbyl" refers to a monovalent radical formed by removing any one hydrogen from a halohydrocarbon molecule. A "halohydrocarbon molecule" is a molecule that results from replacing one or more hydrogen atoms of a hydrocarbon molecule with an equal number of halogen atoms. Unless otherwise noted, each halogen atom is independently selected from the group consisting of fluorine, chlorine, bromine, and iodine. In preferred embodiments, each halogen atom is independently selected from the group consisting of fluorine and chlorine.

As used herein, the term "$C_x$ to $C_y$ hydrocarbyl," where x and y are integers, refers to a hydrocarbyl having from x to y total carbon atoms and a sufficient number of hydrogen atoms to maintain the monovalency of the hydrocarbyl. As non-limiting examples, "$C_1$ to $C_{10}$ hydrocarbyl" encompasses groups such as methyl, ethyl, vinyl (—CH=CH$_2$), allyl (—CH$_2$—CH=CH$_2$), propyl, 1-methylethyl (isopropyl), butyl, 1-methylpropyl, 2-methylpropyl, 1,1-dimethylethyl (tert-butyl), pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, cyclopentyl, cyclohexyl, benzyl, tolyl, and any naphthyl. The term "$C_x$ to $C_y$ halohydrocarbyl" is used analogously. Examples of $C_1$ to $C_{10}$ halohydrocarbyl groups include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

As used herein, the term "hydrocarbylene" refers to a divalent radical formed by removing any two hydrogen atoms from a hydrocarbon. The two hydrogen atoms may have been removed from the same carbon atom or from two different carbon atoms. The term "hydrocarbylene" encompasses linear groups, branched groups, cyclic groups, and combinations thereof, wherein neighboring carbon atoms may be joined by a single bond, a double bond, or a triple bond. Thus, "hydrocarbylene" encompasses both saturated hydrocarbylenes and unsaturated hydrocarbylenes.

As used herein, the term "$C_x$ to $C_y$ hydrocarbylene," where x and y are integers, refers to a hydrocarbylene having from x to y total carbon atoms and a sufficient number of hydrogen atoms to maintain the divalency of the hydrocarbylene. As non-limiting examples, "$C_1$ to $C_{10}$ hydrocarbylene" encompasses groups such as methanediyl (methylene, —$CH_2$—), ethane-1,2-diyl (ethylene, —$CH_2$—$CH_2$—), vinylene (—CH=CH—), propane-1,3-diyl (—$CH_2$—$CH_2$—$CH_2$—), propane-1,2-diyl (—$CH_2$—CH.—$CH_3$), butandiyl, pentandiyl, hexandiyl, heptandiyl, octandiyl, nonandiyl, decandiyl, cyclopentane-1,2-diyl, cyclopentane-1,3-diyl, cyclohexane-1,2-diyl, cyclohexane-1,3-diyl, cyclohexane-1,4-diyl, benzene-1,2-diyl, benzene-1,3-diyl, benzene-1,4-diyl (1,4-phenylene), any toluenediyl, and any naphthylenediyl.

As used herein, the terms "saturated hydrocarbyl," "saturated halohydrocarbyl," and "saturated hydrocarbylene" refer respectively to hydrocarbyls, halohydrocarbyls, and hydrocarbylenes containing no carbon-carbon double bonds and no carbon-carbon triple bonds.

As used herein, the terms "aliphatically saturated hydrocarbyl," "aliphatically saturated halohydrocarbyl," and "aliphatically saturated hydrocarbylene" refer respectively to hydrocarbyls, halohydrocarbyls, and hydrocarbylenes containing no aliphatic carbon-carbon double bonds and no aliphatic carbon-carbon triple bonds. Aliphatically saturated species may or may not contain aromatic carbon-carbon double or triple bonds.

As used herein, the terms "unsaturated hydrocarbyl," "unsaturated halohydrocarbyl," and "unsaturated hydrocarbylene" refer respectively to hydrocarbyls, halohydrocarbyls, and hydrocarbylenes containing at least one carbon-carbon double or triple bond. The at least one carbon-carbon double or triple bond may be aliphatic or aromatic and may be at any position.

Unless otherwise noted, the term "alkenyl group" refers to an unsaturated hydrocarbyl containing at least one aliphatic carbon-carbon double bond. The term "alkenediyl group" refers to an unsaturated hydrocarbylene containing at least one aliphatic carbon-carbon double bond. As used herein, the term "terminal alkenyl group" refers to an alkenyl group having a terminal carbon-carbon double bond. In terminal alkenyl groups, the terminal carbon-carbon double bond is not necessarily the only carbon-carbon double bond. Thus, examples of terminal alkenyl groups include, but are not limited to, vinyl (—CH=$CH_2$), allyl (—$CH_2$—CH=$CH_2$), 5-pentenyl (—$(CH_2)_3$—CH=$CH_2$), 6-hexenyl (—$(CH_2)_4$—CH=$CH_2$), and hex-4,6-dienyl (—$CH_2$—$CH_2$—CH=CH—CH=$CH_2$). Because alkenyl groups represent a subset of hydrocarbyl groups, the term "$C_x$ to $C_y$ hydrocarbyl" may be limited, for example, by reciting that a portion of the $C_x$ to $C_y$ hydrocarbyl groups are alkenyl groups. In this context, it will be understood that the alkenyl groups so recited are equivalent to "$C_x$ to $C_y$ alkenyl groups."

As used herein, the term "W mol. % of groups X in compound Y are Z," or any variation thereof, refers to an average value over all single molecules of compound Y that are present in a sample or solution comprising compound Y. For any single molecule of compound Y, the value of W is the ratio of groups X that are defined as Z in the single molecule to the total number of groups X in the single molecule, multiplied by 100. The average value expressed by the term "W mol. %," therefore, is the sum of all values W for each single molecule, divided by the total number of molecules of compound Y in the sample or solution of compound Y. As an illustration, the compound $CX^1_4$, where $X^1$ is hydrogen or chlorine, defines five possible species, each having four groups $X^1$: $CH_4$, $CH_3Cl$, $CH_2Cl_2$, $CHCl_3$, and $CCl_4$. In this illustration, the term "20 mol. % of groups $X^1$ in the molecule are chlorine" means that in a sample containing, for example, 100 molecules $CX^1_4$, of the 400 groups $X^1$ present in the sample, 80 (20%) are chlorine and 320 (80%) are hydrogen. When expressed without further qualification or limitation, the term "W mol. % of groups X in compound Y are Z" implies nothing with regard to relative numbers or statistical distributions of the possible species. As such, in the above illustration, the 80 chlorine atoms may be present, for example, only on 20 molecules of $CCl_4$, only on 80 molecules of $CH_3Cl$, only on 25 molecules of $CH_2Cl_2$ and 10 molecules of $CHCl_3$, and so forth.

As used herein, the term "an average of at least W group(s) X per molecule of compound Y is(are) Z," or any variation thereof, means that in a given sample or solution comprising a number of molecules of compound Y, the total number of groups X defined as Z on all molecules of compound Y in the given sample or solution, divided by the number of molecules of compound Y in the given sample or solution, is equal to or greater than W. In preferred embodiments, it is to be assumed that a random statistical distribution of the groups X defined as Z is present on the molecules of Y in the given sample or solution. In especially preferred embodiments, the term "an average of at least W group(s) X per molecule of compound Y is(are) Z" may mean "at least W group(s) X on each reactive molecule of compound Y is(are) Z."

As used herein, the terms "cured resin" and "uncured resin" may refer to the same chemical compound, namely a resin having an infinite network structure of covalently bonded monomer units. A cured resin is distinguished from an uncured resin in that the cured resin has an infinite three-dimensional network structure and is insoluble in a specified solvent, whereas an uncured resin retains a significant solubility in the specified solvent. The three-dimensional structure results from crosslinking Consistent with this definition, the term "cured product of a specified resin" means that a curable resin has been subjected to necessary conditions to cause the curable resin to crosslink and form a three-dimensional network. When curing of a resin involves chemical reaction of silicon-hydrogen bonds with other species, such as olefins, it will be understood that cured resins may retain a residual amount of silicon-hydrogen bonds yet still be insoluble in the specified solvent.

According to embodiments disclosed herein, a phosphosiloxane resin comprises a plurality of covalently bonded monomer units. Each covalently bonded monomer unit in the phosphosiloxane resin is selected from the group consisting of a phosphosiloxane unit having formula (I):

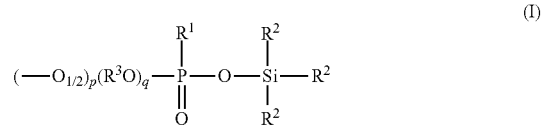

and an organosiloxane unit having formula (II):

such that at least one of the covalently bonded monomer units is a phosphosiloxane unit. Alternatively, at least 0.001 mol. %, at least 0.01 mol. %, at least 0.1 mol. %, at least 1 mol. %, at least 10 mol. %, or at least 25 mol. % of the covalently bonded monomer units are phosphosiloxane units. In preferred embodiments, from 0.001 mol. % to 75 mol. %, from 0.001 mol. % to 50 mol. %, from 0.001 mol. % to 25 mol. %, from 0.01 mol. % to 75 mol. %, from 0.1 mol. % to 75 mol. %, from 1 mol. % to 75 mol. %, from 1 mol. % to 50 mol. %, from 1 mol. % to 25 mol. %, from 10 mol. % to 75 mol. %, from 25 mol. % to 75 mol. %, of the covalently bonded monomer units are phosphosiloxane units, and accordingly from 25 mol. % to 99.999 mol. %, from 50 mol. % to 99.999 mol. %, from 75 mol. % to 99.999 mol. %, from 25 mol. % to 99.99 mol. %, from 25 mol. % to 99.9 mol. %, from 25 mol. % to 99 mol. %, from 50 mol. % to 99 mol. %, from 75 mol. % to 99 mol. %, from 25 mol. % to 90 mol. %, or from 25 mol. % to 75 mol. % of the covalently bonded monomer units are organosiloxane units.

As used herein, the term "covalently bonded" with respect to the covalently bonded monomer units means that each phosphosiloxane unit and each organosiloxane unit within the plurality of covalently bonded monomer units is directly linked through at least one covalent bond to at least one other phosphosiloxane unit or organosiloxane unit. Though in one embodiment 100% of all monomer units in the phosphosiloxane resin are either phosphosiloxane units or organosiloxane units, the definition of "covalently bonded" is not intended to strictly limit the phosphosiloxane resin to only phosphosiloxane units having formula (I) and organosiloxane units having formula (II). Rather, it is contemplated that the phosphosiloxane resin may comprise additional monomer units not encompassed by either formula (I) or formula (II), either as impurities or as intentional additions. In preferred embodiments, at least 75%, at least 80%, at least 90%, at least 95%, at least 99%, at least 99.9%, or at least 99.99% of all monomer units in the phosphosiloxane resin are either phosphosiloxane units or organosiloxane units, as defined above. Further with respect to the above definition of the term "W mol. % of groups X in compound Y are Z," in the term "W mol. % of the covalently bonded monomer units in the phosphosiloxane resin are phosphosiloxane [or organosiloxane] units," the count of total covalently bonded monomer units in the phosphosiloxane resin, on which the mol. % is based, shall include only the phosphosiloxane units and organosiloxane units that are directly linked through at least one covalent bond to at least one other phosphosiloxane unit or organosiloxane unit, as defined above.

In formula (I) and formula (II), groups $R^1$ and $R^2$ may be independently selected from the group consisting of hydrogen, $C_1$ to $C_{10}$ hydrocarbyl, and $C_1$ to $C_{10}$ hydrocarbylene. In further embodiments, groups $R^1$ and $R^2$ may be independently selected from the group consisting of hydrogen, $C_1$ to $C_6$ hydrocarbyl, and $C_1$ to $C_6$ hydrocarbylene. The hydrocarbyl and hydrocarbylene groups are defined as above. In the phosphosiloxane resin, a group $R^1$ or $R^2$ defined as a hydrocarbylene in a first phosphosiloxane or organosiloxane unit may join chemically with a corresponding hydrocarbylene group $R^1$ or $R^2$ in a second phosphosiloxane or organosiloxane unit to form a hydrocarbylene linkage between the first unit and the second unit. When such group $R^1$ or $R^2$ hydrocarbylenes contain aliphatic unsaturation, an olefin in the hydrocarbylene may cross-link with a silicon-bonded hydrogen in another monomer unit. The groups $R^1$ and $R^2$ defined as hydrocarbyls represent terminal groups within the phosphosiloxane resin.

Groups $R^1$ and $R^2$, where defined as hydrogen, represent sites on the individual units open to crosslinking, such as through an alkenyl group or any olefin disposed at a different location within the phosphosiloxane resin. In example embodiments, less than 75 mol. % of all groups $R^1$ and $R^2$ in the phosphosiloxane resin are hydrogen. In preferred embodiments, less than 50%, less than 25%, or less than 10% of all groups $R^1$ and $R^2$ in the phosphosiloxane resin are hydrogen. As will be understood by those skilled in the art, an uncured phosphosiloxane resin typically comprises a higher number of silicon-hydrogen (silane) bonds and phosphorus hydrogen bonds than does a cured phosphosiloxane resin. In further preferred embodiments, in phosphosiloxane units having group $R^1$ as phenyl, at least one group $R^2$ is not phenyl.

In formula (I) and formula (II), each $R^3$ may be independently selected from the group consisting of hydrogen and $C_1$ to $C_{10}$ hydrocarbyl. In further embodiments, each $R^3$ may be independently selected from the group consisting of hydrogen and $C_1$ to $C_6$ hydrocarbyl. Thus, groups —$OR^3$, present in phosphosiloxane units having q=1 and in organosiloxane units having n>0, may be hydroxyl or hydrocarbyloxy terminal groups. Such terminal groups typically are residual from the processes used to synthesize the phosphosiloxane resin, and in preferred embodiments their occurrence within the phosphosiloxane resin is minimized. Even so, in some circumstances it may be desirable to include certain types of terminal groups so as to tailor the properties of the phosphosiloxane resin.

In each phosphosiloxane unit, subscript p is 0 or 1, and subscript q is 1−p. In a non-terminal phosphosiloxane unit, i.e., a phosphosiloxane unit wherein subscript p is 1, the non-terminal phosphosiloxane unit comprises an $O_{1/2}$ atom that is shared with a corresponding $O_{1/2}$ atom present on either an organosiloxane unit or another phosphosiloxane unit. The two $O_{1/2}$ atoms combine together to result in an Si—O—P linkage or a P—O—P linkage between the non-terminal phosphosiloxane unit and the organosiloxane unit or other phosphosiloxane unit. Terminal phosphosiloxane units, i.e., phosphosiloxane units wherein subscript q is 1, comprise a terminal group $R^3O$— joined to the phosphorus atom. Because these $R^3O$— groups are typically residual from the formation of the phosphosiloxane resin, typically less than 25 mol. % of all phosphosiloxane units in the phosphosiloxane resin have q=1. In preferred embodiments, less than 10 mol. %, less than 5 mol. %, less than 1 mol. %, less than 0.1 mol. % or even about 0 mol. % of all phosphosiloxane units in the phosphosiloxane resin have q=1. At least one group $R^1$ or $R^2$ must be $C_1$ to $C_{10}$ hydrocarbylene in each phosphosiloxane unit having p=0 and q=1, to ensure that such a phosphosiloxane can connect with at least one other monomer unit in the phosphosiloxane resin.

In each organosiloxane unit, subscript m is independently 0, 1, 2, 3, or 4. Subscript m represents silicon-bonded groups $R^2$, where $R^2$ is hydrogen, $C_1$ to $C_{10}$ hydrocarbyl, or $C_1$ to $C_{10}$ hydrocarbylene. Thus, a first portion of groups encompassed under subscript m are silicon-bonded hydrogens, representing sites for cross-linking or hydrosilylation. A second portion of groups encompassed under subscript m are silicon-bonded hydrocarbyls, representing terminal groups on the phosphosiloxane resin. A third portion of groups encompassed under subscript m are silicon-bonded hydrocarbylenes, which hydrocarbylenes may join to corresponding hydrocarbylenes on phosphosiloxane units or other organosiloxane units. When such hydrocarbylenes contain aliphatic unsaturation, an olefin in the hydrocarbylene may cross-link with a silicon-bonded hydrogen in another monomer unit. Over all of the organosiloxane units present in the phosphosiloxane resin, m may have an average value of from 0.0001 to 3.95.

In each organosiloxane unit, subscript n is 0, 1, or 2, such that in each organosiloxane unit m+n is 0, 1, 2, 3, or 4. Where subscript n is 1 or 2, the organosiloxane unit comprises 1 or 2 terminal groups —$OR^3$. Because these —$OR^3$ groups are residual from the formation of the phosphosiloxane resin, typically less than 5 mol. % of all organosiloxane units have n>0. In preferred embodiments, less than 1 mol. %, less than 0.1 mol. %, or even nearly 0 mol. % of all organosiloxane units have n>0.

The sum of subscript m and subscript n in each organosiloxane unit has an average value of from 0.0001 to 3.95 over all of the organosiloxane units present in the phosphosiloxane resin. Thus, the organosiloxane units in any phosphosiloxane resin may have a large variety of structural distributions including combinations of Q units ($SiO_{4/2}$; m+n=0), T units ($RSiO_{3/2}$; m+n=1), D units ($R_2SiO_{2/2}$; m+n=2), M units ($R_3SiO_{1/2}$; m+n=3), and hydrocarbylene-linked silyl units ($R_4Si$; m+n=4), where R refers generally to the $R^2{}_m(OR^3)_n$— portion of the organosiloxane unit. At least one group $R^2$ must be $C_1$ to $C_{10}$ hydrocarbylene in each organosiloxane unit having m+n=4, to ensure that such an organosiloxane unit can connect to at least one other monomer unit in the phosphosiloxane resin.

In some embodiments, the phosphosiloxane resin may comprise per molecule an average of at least one group $R^1$ or $R^2$ that are alkenyl groups, as defined above. In preferred embodiments, the phosphosiloxane resin may comprise per molecule an average of greater than one group $R^1$ or $R^2$ that are alkenyl groups. As non-limiting examples, the phosphosiloxane resin may comprise per molecule an average of 1.01, 1.05, 1.10, 1.25, 1.50, 2.00, or even 10, 100, 1000, or 10,000 or more groups $R^1$ or $R^2$ that are alkenyl groups. Phosphosiloxane resins having at least one silicon-bonded alkenyl group per molecule may be included, for example, in curable silicone compositions comprising at least one other silicone resin having silicon-bonded hydrogen atoms. Curing of such curable silicone compositions results in joining of or cross-linking between the phosphosiloxane resin and the silicone resin. As such, when an average of exactly one group $R^1$ or $R^2$ in the phosphosiloxane resin is an alkenyl group, molecules of the phosphosiloxane resin can joined to the silicone resin, such as at a terminal group of the silicone resin. When an average of greater than one group $R^1$ or $R^2$ in the phosphosiloxane resin are alkenyl groups, molecules of the phosphosiloxane resin can join to the silicone resin and also crosslink with the silicone resin to some degree.

In preferred embodiments, at least 25 mol. %, at least 50 mol. %, or at least 75 mol. % of all groups $R^1$ and $R^2$ in the phosphosiloxane resin are alkenyl groups, as defined above. Alkenyl groups in the phosphosiloxane resin may provide functionality for cross-linking the phosphosiloxane resin when the phosphosiloxane resin is part of a curable silicone composition including an organosiloxane resin, as will be described in greater detail below. In preferred embodiments, at least 25 mol. %, at least 50 mol. %, or at least 75 mol. % of all groups $R^1$ and $R^2$ in the phosphosiloxane resin are terminal alkenyl groups, as defined above. Though any carbon-carbon double bond of any group $R^1$ and $R^2$ may be reactive toward cross-linking, terminal alkenyl groups have been found to be the most reactive. In further preferred embodiments, the terminal alkenyl groups may be selected from the group consisting of vinyl (—CH=CH$_2$), allyl (—CH$_2$—CH=CH$_2$), 5-pentenyl (—(CH$_2$)$_3$—CH=CH$_2$), and 6-hexenyl (—(CH$_2$)$_4$—CH=CH$_2$).

In an example embodiment of the phosphosiloxane resin, at least 25 mol. % of all groups $R^1$ and $R^2$ in the phosphosiloxane resin may be vinyl groups, from 5 mol. % to 75 mol. % of all groups $R^1$ in the phosphosiloxane resin may be hydrogen, and all groups $R^3$ may be independently selected from the group consisting of hydrogen, methyl, vinyl, or phenyl. In an additional example embodiment of the phosphosiloxane resin, each $R^1$ and each $R^2$ may be independently selected from the group consisting of methyl, ethyl, propyl, butyl, pentyl, hexyl, vinyl, and phenyl, such that at least 25 mol. % of all groups $R^1$ and $R^2$ in the phosphosiloxane resin are vinyl. In the same example embodiment, from 5 mol. % to 75 mol. % of all groups $R^1$ may be hydrogen, and each $R^3$ may be independently selected from the group consisting of hydrogen, methyl, ethyl, propyl, and phenyl.

In preferred embodiments of the phosphosiloxane resin, a plurality of pairs of the covalently bonded monomer units may be joined so as to form within the phosphosiloxane resin one or more organically bridged disilyl linkages having formula (III)

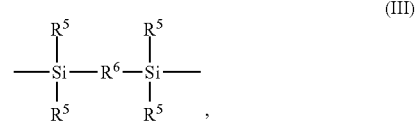

where each $R^5$ is an aliphatically saturated $C_1$ to $C_{10}$ hydrocarbyl, defined as above, and $R^6$ is a $C_1$ to $C_{10}$ hydrocarbylene, defined as above. In example preferred embodiments of this type, each $R^5$ may be independently selected from the group consisting of methyl, ethyl, propyl, phenyl, and tert-butyl. In further example preferred embodiments of this type, each $R^6$ may be independently selected from the group consisting of methylene, ethylene, 1,3-propylene, butylenes, pentylenes, 1,2-phenylene, 1,3-phenylene, and 1,4-phenylene.

One or more uncured phosphosiloxane resins described in the embodiments above may be incorporated as a component of a curable silicone composition. In preferred embodiments, the curable silicone composition is a hydrosilylation-curable composition. In a first curable silicone composition, at least one phophosiloxane resin and at least one organosilicon compound are included together with a hydrosilylation catalyst. In a second curable silicone composition, a phosphonate compound is added to a mixture comprising at least one silicone resin, at least one organosilicon compound, and a hydrosilylation catalyst, such that a cured phosphosiloxane resin results from the curing of the second curable silicone composition.

In embodiments of the first curable silicone composition, the first curable silicone composition may comprise (A) at least one phosphosiloxane resin, as described above, having an average of greater than one silicon-bonded alkenyl groups per molecule; (B) at least one organosilicon compound having an average of at least two silicon-bonded hydrogen atoms per molecule, preferably in an amount sufficient to cure the phosphosiloxane resin; and (C) a catalytic amount of a hydrosilylation catalyst.

Component (A) of the curable silicone composition is at least one phosphosiloxane resin, as described above, having an average of greater than one silicon-bonded alkenyl groups per molecule. In preferred embodiments, component (A) is a phosphosiloxane resin, wherein at least 25 mol. %, at least 50 mol. %, or at least 75 mol. % of all the groups $R^1$ and $R^2$ in the phosphosiloxane resin are alkenyl groups. It may also be preferable that at least 25 mol. %, at least 50 mol. %, or at least 75 mol. % of all the groups $R^1$ and $R^2$ in the phosphosiloxane resin be terminal alkenyl groups.

Component (B) is at least one organosilicon compound having an average of at least one silicon-bonded hydrogen atom per molecule, preferably at least two silicon-bonded hydrogen atoms per molecule. In preferred curable silicone compositions, a sufficient number of silicon-bonded hydrogen atoms are present to combine, for example, with alkenyl groups on the phosphosiloxane resin (A) and thereby completely cure the phosphosiloxane resin (A).

The organosilicon compound preferably has an average of at least two silicon-bonded hydrogen atoms per molecule, alternatively at least three silicon-bonded hydrogen atoms per molecule. It is generally understood that cross-linking occurs most favorably when the sum of the average number of alkenyl groups per molecule in component (A) and the average number of silicon-bonded hydrogen atoms per molecule in component (B) is greater than four.

The organosilicon compound can be an organohydrogensilane or an organohydrogensiloxane. The organohydrogensilane can be a monosilane, a disilane, a trisilane, or a polysilane. Similarly, the organohydrogensiloxane can be a disiloxane, a trisiloxane, or a polysiloxane. The structure of the organosilicon compound can be linear, branched, cyclic, or resinous. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane; 2-chloroethylsilane; bis[(p-dimethylsilyl)phenyl]ether; 1,4-dimethyldisilylethane; 1,3,5-tris(dimethylsilyl)benzene; 1,3,5-trimethyl-1,3,5-trisilane; poly(methylsilylene)phenylene; and poly(methylsilylene)methylene.

The organohydrogensilane may have the formula $HQ^1_2Si-Q^3-SiQ^1_2H$, where $Q^1$ is aliphatically saturated $C_1$ to $C_{10}$ hydrocarbyl or an aliphatically saturated $C_1$ to $C_{10}$ halohydrocarbyl, and $Q^3$ is an aliphatically saturated hydrocarbylene group selected from the group consisting of:

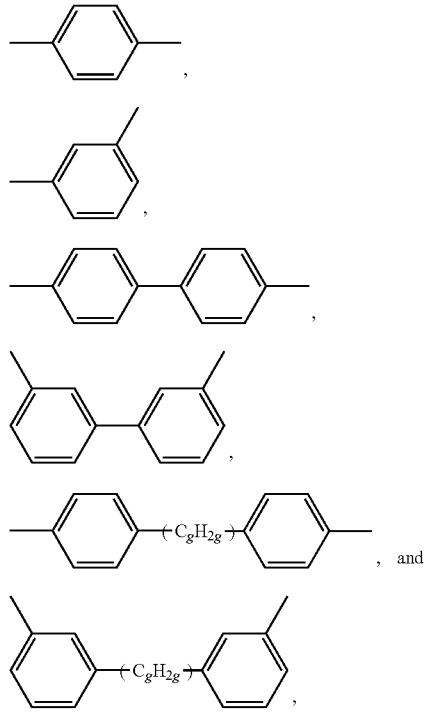

wherein g is from 1 to 6. The hydrocarbyl groups represented by $Q^1$ are as defined and exemplified above for the phosphosiloxane resin of component (A), and the halohydrocarbyl groups represented by $Q^1$ may include any of the hydrocarbyl groups, in which one or more hydrogen atoms is replaced with an equal number of halogen atoms.

Examples of organohydrogensilanes having the formula $HQ^1_2Si-Q^3-SiQ^1_2H$, wherein $Q^1$ and $Q^3$ are as described and exemplified above include, but are not limited to, silanes such as:

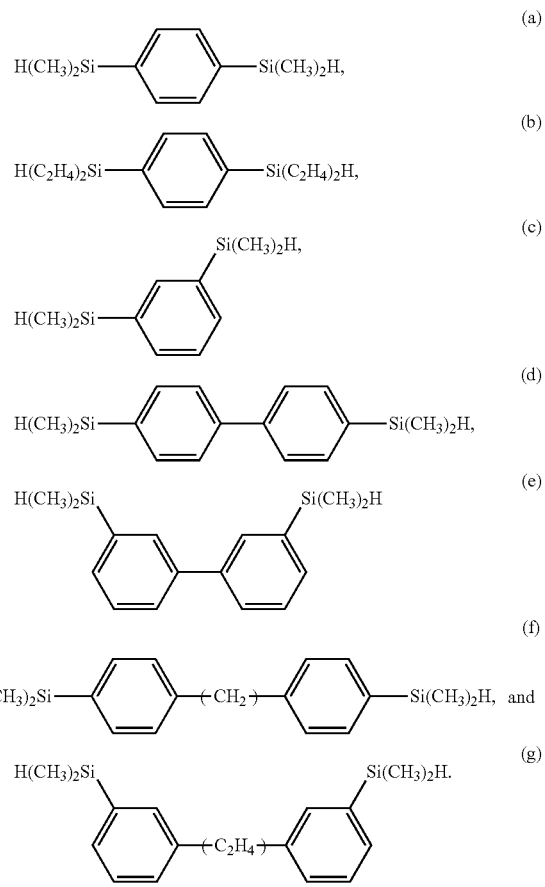

Examples of organohydrogensiloxanes include, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin consisting essentially of $HMe_2SiO_{1/2}$ units, $Me_3SiO_{1/2}$ units, and $SiO_{4/2}$ units, where Me is methyl.

The organohydrogensiloxane also may be an organohydrogenpolysiloxane resin having the formula (B1):

$$(Q^1Q^4_2SiO_{1/2})_w(Q^4_2SiO_{2/2})_x(Q^1SiO_{3/2})_y(SiO_{4/2})_z \qquad (B1)$$

where $Q^1$ is an aliphatically saturated $C_1$ to $C_{10}$ hydrocarbyl or an aliphatically saturated $C_1$ to $C_{10}$ halohydrocarbyl, $Q^4$ is $Q^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, wherein at least 50 mol % of the groups $Q^4$ are organosilylalkyl.

The hydrocarbyl and halohydrocarbyl groups represented by $Q^1$ are as described and exemplified above for the silicone resin of component (A). Examples of organosilylalkyl groups represented by $Q^4$ include, but are not limited to, groups such as:

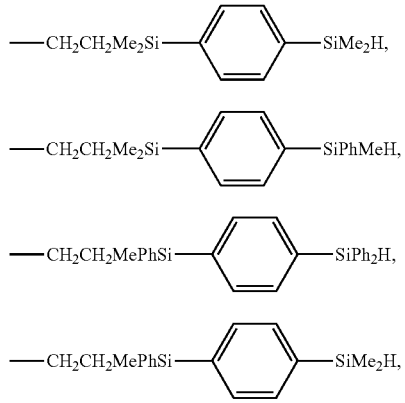

(e) —$CH_2CH_2SiMe_2H$,
(f) —$CH_2CH_2SiMe_2C_nH_{2n}SiMe_2H$,
(g) —$CH_2CH_2SiMe_2C_nH_{2n}SiMePhH$,
(h) —$CH_2CH_2SiMePhH$,
(i) —$CH_2CH_2SiPh_2H$,
(j) —$CH_2CH_2SiMePhC_nH_{2n}SiPh_2H$,
(k) —$CH_2CH_2SiMePhC_nH_{2n}SiMe_2H$,
(l) —$CH_2CH_2SiMePhOSiMePhH$, and
(m) —$CH_2CH_2SiMePhOSiPh(OSiMePhH)_2$,
where Me is methyl, Ph is phenyl, and the subscript n has a value of from 2 to 10.

In the formula (B1) of the organohydrogenpolysiloxane resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0.01 to 0.80, alternatively from 0.05 to 0.5, alternatively from 0.1 to 0.35. Typically, at least 50 mol %, at least 65 mol %, or at least 80 mol % of the groups $Q^4$ in the organohydrogenpolysiloxane resin are organosilylalkyl groups having at least one silicon-bonded hydrogen atom.

The organohydrogenpolysiloxane resin typically has a number-average molecular weight ($M_n$) of from 500 to 50,000, from 500 to 10,000, or from 1,000 to 3,000, where the molecular weight is determined by gel-permeation chromatography employing a low-angle laser-light scattering detector, or a refractive-index detector and silicone resin (MQ) standards.

The organohydrogenpolysiloxane resin typically contains less than 10% (w/w), less than 5% (w/w), or less than 2% (w/w), of silicon-bonded hydroxy groups, as determined by $^{29}Si$ NMR.

The organohydrogenpolysiloxane resin may contain $Q^1SiO_{3/2}$ units (i.e., T units) and/or $SiO_{4/2}$ units (i.e., Q units) in combination with $Q^1Q^4{}_2SiO_{1/2}$ units (i.e., M units) and/or $Q^4{}_2SiO_{2/2}$ units (i.e., D units), where $Q^1$ and $Q^4$ are as described and exemplified above. For example, the organo-hydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organohydrogenpolysiloxane resins include, but are not limited to, resins such as:
$((HMe_2SiC_6H_4SiMe_2CH_2CH_2)_2MeSiO_{1/2})_{0.12}(PhSiO_{3/2})_{0.88}$,
$((HMe_2SiC_6H_4SiMe_2CH_2CH_2)_2MeSiO_{1/2})_{0.17}(PhSiO_{3/2})_{0.83}$,
$((HMe_2SiC_6H_4SiMe_2CH_2CH_2)_2MeSiO_{1/2})_{0.17}(MeSiO_{3/2})_{0.17}(PhSiO_{3/2})_{0.66}$,
$((HMe_2SiC_6H_4SiMe_2CH_2CH_2)_2MeSiO_{1/2})_{0.15}(PhSiO_{3/2})_{0.75}(SiO_{4/2})_{0.10}$, and
$((HMe_2SiC_6H_4SiMe_2CH_2CH_2)_2MeSiO_{1/2})_{0.08}((Me_2SiC_6H_4SiMe_2CH_2CH_2)Me_2SiO_{1/2})_{0.06}(PhSiO_{3/2})_{0.86}$,
where Me is methyl, Ph is phenyl, $C_6H_4$ denotes a 1,4-phenylene group, and the numerical subscripts outside the parentheses denote mole fractions. Also, in the preceding formulas, the sequence of units is unspecified.

In further example embodiments, component (B) of the curable silicone composition may be a single organosilicon compound or a mixture comprising two or more different organosilicon compounds, each as described above. For example, component (B) may be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, component (B) may be a mixture comprising at least 0.5% (w/w), at least 50% (w/w), or at least 75% (w/w), based on the total weight of component (B), of the organohydrogenpolysiloxane resin having the formula (B1), and an organohydrogensilane and/or organohydrogensiloxane, the latter different from the organohydrogenpolysiloxane resin.

In preferred embodiments, the concentration of component (B) is sufficient to cure (cross-link) the phosphosiloxane resin of component (A). The exact amount of component (B) depends on the desired extent of cure, which generally increases as the ratio of the number of moles of silicon-bonded hydrogen atoms in component (B) to the number of moles of alkenyl groups in component (A) increases. The concentration of component (B) is typically sufficient to provide from 0.4 moles to 2 moles of silicon-bonded hydrogen atoms, from 0.8 moles to 1.5 moles of silicon-bonded hydrogen atoms, or from 0.9 moles to 1.1 moles of silicon-bonded hydrogen atoms, per mole of alkenyl groups in component (A).

Methods of preparing organosilicon compounds containing silicon-bonded hydrogen atoms are well known in the art. For example, organohydrogensilanes can be prepared by reaction of Grignard reagents with alkyl or aryl halides. In particular, organohydrogensilanes having the formula $HQ^1{}_2$—Si-$Q^3$—$SiQ^1{}_2H$ may be prepared by treating an aryl dihalide having the formula $Q^3X_2$ with magnesium in ether to produce the corresponding Grignard reagent, and then treating the Grignard reagent with a chlorosilane having the formula $HQ^1{}2SiCl$, where $Q^1$ and $Q^3$ are as described and exemplified above. Methods of preparing organohydrogensiloxanes, such as by hydrolysis and condensation of organohalosilanes, also are well known in the art.

In addition, the organohydrogenpolysiloxane resin having the formula (B1) may be prepared by reacting (a) a silicone resin having the formula (B2):

$$(Q^1Q^2{}_2SiO_{1/2})_w(Q^2{}_2SiO_{2/2})_x(Q^1SiO_{3/2})_y(SiO_{4/2})_z \qquad (B2)$$

with (b) an organosilicon compound having an average of from two to four silicon-bonded hydrogen atoms per molecule and a molecular weight less than 1,000, in the presence of (c) a hydrosilylation catalyst and, optionally, (d) an organic solvent, wherein $Q^1$ is an aliphatically saturated $C_1$ to $C_{10}$ hydrocarbyl or an aliphatically saturated $C_1$ to $C_{10}$ halohydrocarbyl, $Q^2$ is $Q^1$ or alkenyl, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8. In the above reaction, the silicone resin (a) has an average of at least two silicon-bonded alkenyl groups per molecule, and the mole ratio of silicon-bonded hydrogen atoms in the organosilicon compound (b) to alkenyl groups in the silicone resin (a) is from 1.5 to 5.

Component (C) of the curable silicone composition is at least one hydrosilylation catalyst that promotes an addition reaction of component (A) with component (B). The hydrosilylation catalyst may be any of the well-known hydrosilylation catalysts comprising a platinum group metal, a compound containing a platinum group metal, or a microencapsulated platinum-group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyl-disiloxane.

The hydrosilylation catalyst may be a microencapsulated platinum-group metal-containing catalyst comprising a platinum-group metal encapsulated in a thermoplastic resin. Compositions containing microencapsulated hydrosilylation catalysts are stable for extended periods of time, typically several months or longer, under ambient conditions, but cure relatively rapidly at temperatures above the melting or softening point of the thermoplastic resin(s). Microencapsulated hydrosilylation catalysts and methods of preparing them are well known in the art, as exemplified in U.S. Pat. No. 4,766, 176 and the references cited therein; and in U.S. Pat. No. 5,017,654.

Component (C) may be a single hydrosilylation catalyst or a mixture comprising two or more different catalysts that differ in at least one property, such as structure, form, platinum-group metal, complexing ligand, and thermoplastic resin.

The concentration of component (C) is sufficient to catalyze the addition reaction of component (A) with component (B). Typically, the concentration of component (C) is sufficient to provide from 0.1 ppm to 1000 ppm of a platinum-group metal, preferably from 0.5 ppm to 500 ppm of a platinum-group metal, and more preferably from 1 ppm to 20 ppm of a platinum-group metal, based on the combined weight of components (A) and (B). The rate of cure is very slow below 0.1 ppm of platinum-group metal. The use of more than 1000 ppm of platinum group metal results in no appreciable increase in cure rate, and is therefore uneconomical.

The curable silicone composition may comprise additional ingredients, provided the ingredient does not prevent the phosphosiloxane resin from curing. Examples of additional ingredients include, but are not limited to, hydrosilylation-catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087, 585 and 5,194,649; dyes; pigments; anti-oxidants; heat stabilizers; UV stabilizers; flame retardants; flow control additives; fillers, such as reinforcing fillers and extending fillers; and diluents, such as organic solvents and reactive diluents.

The curable silicone composition typically does not contain an organic solvent. However, the composition may further comprise an organic solvent to reduce viscosity of the composition or facilitate application of the composition on a substrate.

In one embodiment, the curable silicone composition further comprises a reactive diluent. For example, the curable silicone composition can further comprise a reactive diluent comprising an organosiloxane diluent having an average of at least two silicon-bonded alkenyl groups per molecule and a viscosity of from 0.001 Pa·s to 2 Pa·s at 25° C., wherein the viscosity of the organosiloxane diluent is not greater than 20% of the viscosity of the phosphosiloxane component (A) of the curable silicone composition. The organosiloxane diluent may have the formula (D1):

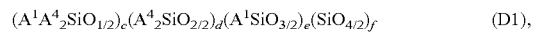

wherein $A^1$ is an aliphatically saturated $C_1$ to $C_{10}$ hydrocarbyl or an aliphatically saturated $C_1$ to $C_{10}$ halohydrocarbyl, $A^4$ is $A^1$ or alkenyl, c is from 0 to 0.8, d is from 0 to 1, e is from 0 to 0.2, f is from 0 to 0.2, c+d+e+f=1, and c+d is not equal to 0. Also, when e+f=0, d is not equal to 0, and the alkenyl groups are not all terminal. The organosiloxane diluent may have a linear, branched, or cyclic structure.

The viscosity of the organosiloxane diluent at 25° C. is typically from 0.001 Pa·s to 2 Pa·s, alternatively from 0.001 Pa·s to 0.1 Pa·s, alternatively from 0.001 Pa·s to 0.05 Pa·s. Further, the viscosity of the organosiloxane diluent at 25° C. is typically not greater than 20%, not greater than 10%, or even not greater than 1%, of the viscosity of the phosphosiloxane (A) in the curable silicone composition.

Examples of organosiloxane diluents suitable for use as reactive diluents include, but are not limited to, organosiloxanes such as $(ViMeSiO)_3$, $(ViMeSiO)_4$, $(ViMeSiO)_5$, $(ViMeSiO)_6$, $(ViPhSiO)_3$, $(ViPhSiO)_4$, $(ViPhMeSi)_2O$, $(ViMe_2Si)_2O$, $(ViPhSiO)_5$, $(ViPhSiO)_6$, $ViMe_2SiO(ViMeSiO)_nSiMe_2Vi$, $Me_3SiO(ViMeSiO)_nSiMe_3$, and $(ViMe_2SiO)_4Si$, where Me is methyl, Ph is phenyl, Vi is vinyl, and the subscript n has a value such that the organosiloxane diluent has a viscosity of from 0.001 Pa·s to 2 Pa·s at 25° C.

The reactive diluent may be a single organosiloxane diluent or a mixture comprising two or more different organosiloxane diluents, each as described above. Methods of making alkenyl-functional organosiloxanes are well known in the art.

The concentration of the reactive diluent in the curable silicone composition is typically from 1% to 20% (w/w), from 1% to 10% (w/w), or from 1% to 5% (w/w), based on the combined weight of the phosphosiloxane resin (A) and the organosilicon compound (B). In preferred embodiments, the concentration of the reactive diluent in the curable silicone composition is such that the ratio of the sum of the number of moles of aliphatic carbon-carbon double bonds in the organosilicon compound (B), and the reactive diluent to the number of moles of silicon-bonded hydrogen atoms in the phosphosiloxane resin (A), is typically from 0.005 to 0.7, alternatively from 0.03 to 0.3, alternatively from 0.05 to 0.2.

The curable silicone composition may further comprise at least one ceramic filler. Examples of ceramic fillers include, but are not limited to, nitrides such as silicon nitride, boron nitride, aluminum nitride, titanium nitride, and zirconium nitride; carbides such as silicon carbide, boron carbide, tungsten carbide, titanium carbide, zirconium carbide, and molybdenum carbide; metal oxides, such as the oxides of aluminum, magnesium, zinc, beryllium, zirconium, titanium and thorium; silicates, such as the silicates of aluminum, magnesium, zirconium, and titanium; and complex silicates, such as magnesium aluminum silicate.

The curable silicone composition may be prepared, for example, by combining the components (A), (B), and (C), and any optional ingredients in the stated proportions at ambient temperature, with or without the aid of an organic solvent. Although the order of addition of the various components is not critical if the curable silicone composition is to be used immediately, the hydrosilylation catalyst is preferably added last at a temperature below about 30° C. to prevent premature curing of the composition. Mixing may be accomplished by any of the techniques known in the art such as milling, blending, and stirring, either in a batch or continuous process, for example. The particular device is determined by the viscosity of the components and the viscosity of the final curable silicone composition.

In embodiments of the second curable silicone composition, the second curable silicone composition may comprise (A) at least one silicone resin having an average of at least two silicon-bonded alkenyl groups per molecule; (B) at least one organosilicon compound having an average of at least two silicon-bonded hydrogen atoms per molecule, preferably in an amount sufficient to cure the phosphosiloxane resin; (C) at least one phosphonate compound; and (D) a catalytic amount of a hydrosilylation catalyst.

In the second curable silicone composition, the organosilicon compound (B) and the hydrosilylation catalyst (D) are as described above for the first curable silicone composition.

In the second curable silicone composition, component (A) is at least one silicone resin having the formula (A1):

$$(Z^1Z^2{}_2SiO_{1/2})_w(Z^2{}_2SiO_{2/2})_x(Z^1SiO_{3/2})_y(SiO_{4/2})_z \quad (A1),$$

where $Z^1$ is an aliphatically saturated $C_1$ to $C_{10}$ hydrocarbyl or an aliphatically saturated $C_1$ to $C_{10}$ halohydrocarbyl, $Z^2$ is a $C_1$ to $C_{10}$ hydrocarbyl or a $C_1$ to $C_{10}$ halohydrocarbyl, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8. The at least one silicone resin (A) has an average of at least two silicon-bonded alkenyl groups per molecule.

The hydrocarbyl and halohydrocarbyl groups represented by $Z^1$ are free of aliphatic unsaturation and may have from 1 to 10 carbon atoms, alternatively from 1 to 6 carbon atoms. Acyclic hydrocarbyl and halohydrocarbyl groups containing at least 3 carbon atoms may have a branched or unbranched structure. Examples of hydrocarbyl groups represented by $Z^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halohydrocarbyl groups represented by $Z^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The hydrocarbyl and halohydrocarbyl groups represented by $Z^2$, which may be the same or different, typically have from 2 to about 10 carbon atoms, alternatively from 2 to 6 carbon atoms. In addition to the non-limiting example groups listed for $Z^1$ above, groups represented by $Z^2$ may include aliphatic unsaturation, as exemplified by alkenyl groups including, but not limited to, vinyl, allyl, butenyl, hexenyl, and octenyl.

In the formula (A1) of the silicone resin (A), the subscripts w, x, y, and z are mole fractions. The subscript w may have a value of from 0 to 0.8, from 0.02 to 0.75, or from 0.05 to 0.3. The subscript x may have a value of from 0 to 0.6, from 0 to 0.45, or from 0 to 0.25. The subscript y may have a value of from 0 to 0.99, from 0.25 to 0.8, or from 0.5 to 0.8. The subscript z may have a value of from 0 to 0.35, from 0 to 0.25, or from 0 to 0.15. Also, the ratio y+z/(w+x+y+z) is typically from 0.2 to 0.99, from 0.5 to 0.95, or from 0.65 to 0.9. Further, the ratio w+x/(w+x+y+z) is typically from 0.01 to 0.80, from 0.05 to 0.5, or from 0.1 to 0.35. Typically at least 25 mol. %, at least 35 mol. %, at least 50 mol %, at least 65 mol %, or at least 80 mol % of the groups $Z^2$ in the silicone resin are alkenyl groups.

The at least one silicone resin (A) may have a number-average molecular weight ($M_n$) of from 500 to 50,000, alternatively from 500 to 10,000, alternatively 1,000 to 3,000, where the molecular weight is determined by gel permeation chromatography employing silicone resin (MQ) standards with a low-angle laser-light scattering detector or a refractive index detector. The viscosity of the at least one silicone resin (A) at 25° C. may range from 0.01 Pa·s to 100,000 Pa·s, from 0.1 Pa·s to 10,000 Pa·s, or from 1 Pa·s to 100 Pa·s. The at least one silicone resin (A) may contain less than 10% (w/w), less than 5% (w/w), or less than 2% (w/w), of silicon-bonded hydroxy groups, as determined by $^{29}$Si NMR.

The at least one silicone resin may contain $Z^1SiO_{3/2}$ units (i.e., T units) and/or $SiO_{4/2}$ units (i.e., Q units) in combination with $Z^1Z^2{}_2SiO_{1/2}$ units (i.e., M units) and/or $Z^2{}_2SiO_{2/2}$ units (i.e., D units), where $Z^1$ and $Z^2$ are as described and exemplified above. For example, the at least one silicone resin may be a DT resin, an MT resin, an MDT resin, a DTQ resin, an MTQ resin, an MDTQ resin, a DQ resin, an MQ resin, a DTQ resin, an MTQ resin, or an MDQ resin.

Examples of silicone resin (A) include, but are not limited to, silicone resins such as:
(a) $(Vi_2MeSiO_{1/2})_{0.25}(PhSiO_{3/2})_{0.75}$,
(b) $(ViMe_2SiO_{1/2})_{0.25}(PhSiO_{3/2})_{0.75}$,
(c) $(ViMe_2SiO_{1/2})_{0.25}(MeSiO_{3/2})_{0.25}(PhSiO_{3/2})_{0.50}$,
(d) $(ViMe_2SiO_{1/2})_{0.15}(PhSiO_{3/2})_{0.75}(SiO_{4/2})_{0.1}$, and
(e) $(Vi_2MeSiO_{1/2})_{0.15}(ViMe_2SiO_{1/2})_{0.1}(PhSiO_{3/2})_{0.75}$,
where Me is methyl, Vi is vinyl, Ph is phenyl, and the numerical subscripts outside the parenthesis are mole fractions. These formulas are not limited to any specific sequence of monomer units and may represent random or block copolymers. The at least one silicone resin (A) may be a single silicone resin or a mixture comprising two or more different silicone resins, each as described above.

Methods of preparing silicone resins are well known in the art; many of these resins are commercially available. Silicone resins are typically prepared by cohydrolyzing the appropriate mixture of chlorosilane precursors in an organic solvent, such as toluene. For example, a silicone resin consisting essentially of $Z^1Z^2{}_2SiO_{1/2}$ units and $Z^1SiO_{3/2}$ units can be prepared by cohydrolyzing a compound having the formula $Z^1Z^2{}_2SiCl$ and a compound having the formula $Z^1SiCl_3$ in toluene, where $Z^1$ and $Z^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, —NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

In the second curable silicone composition, the at least one phosphonate compound (C) may have the formula (IV)

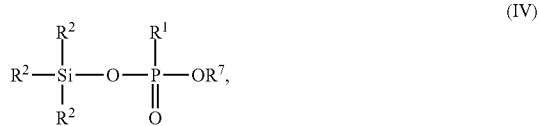

where R$^1$ and each R$^2$ are hydrogen or a C$_1$ to C$_{10}$ hydrocarbyl; and R$^7$ is —SiR$^2{}_3$, hydrogen, or a C$_1$ to C$_{10}$ hydrocarbyl, defined as above with regard to the phosphosiloxane resin. At least one group R$^2$ per molecule of the at least one phosphonate compound (C) is an alkenyl group, defined as above. In preferred embodiments, group R$^7$ is —SiR$^2{}_3$, and groups R$^2$ in the phosphonate compound (C) may be selected from the group consisting of hydrogen, methyl, vinyl, allyl, and phenyl, where at least one group R$^2$ per molecule is vinyl or allyl.

The at least one silicone resin (A), the at least one organosilicon compound (B), the at least one phosphonate compound (C), and the hydrosilylation catalyst (D) may be mixed as described above with respect to the first curable silicone composition to form the second curable silicone composition. The proportion of each component is such that for each alkenyl group there is on average from 0.4 to 2 silicon-bonded hydrogen groups, and an amount of hydrosilylation catalyst sufficient to cure the resin.

Further embodiments are directed to free-standing reinforced phosphosiloxane-resin films. The free-standing resin films comprise a cured product of the first curable silicone composition or the second curable silicone composition described above, and a fiber reinforcement dispersed in the cured product of the curable silicone composition. As defined above with respect to cured products generally, cured products of the first curable silicone composition or the second curable silicone composition result from subjecting the compositions to necessary conditions to cause the resinous components of the composition to crosslink and form a three-dimensional network.

In the free-standing reinforced phosphosiloxane-resin films, the fiber reinforcement can be any reinforcement comprising fibers that impart to the films a high modulus and high tensile strength. The fiber reinforcement may have a Young's modulus at 25° C. of at least 3 GPa. For example, the reinforcement may have a Young's modulus at 25° C. of from 3 GPa to 1,000 GPa, from 3 GPa to 200 GPa, or from 10 GPa to 100 GPa. Moreover, the reinforcement may have a tensile strength at 25° C. of at least 50 MPa. For example, the reinforcement typically may have a tensile strength at 25° C. of from 50 MPa to 10,000 MPa, from 50 MPa to 1,000 MPa, or from 50 MPa to 500 MPa.

The fiber reinforcement may be a woven fabric such as a cloth, a nonwoven fabric such as a mat or a roving-fiber fabric, or loose individual fibers. The fibers in the reinforcement may be cylindrical in shape, with diameters of from 1 μm to 100 μm, from 1 μm to 20 μm, or from 1 μm to 10 μm. Loose fibers may be continuous or chopped. As used herein, the term "continuous" with regard to loose fibers means that the fibers extend throughout the reinforced phosphosiloxane-resin film in a generally unbroken manner.

The fiber reinforcement may be heat-treated to remove organic contaminants before being added to the resin. For example, the fiber reinforcement may be heated in air at an elevated temperature, for example, 575° C., for a suitable period of time, for example 2 hours.

Examples of fiber reinforcements include, but are not limited to reinforcements comprising glass fibers; quartz fibers; graphite fibers; nylon fibers; polyester fibers; aramid fibers, such as Kevlar® and Nomex®; polyethylene fibers; polypropylene fibers; and silicon carbide fibers.

The fiber reinforcement can be impregnated in a curable silicone composition using a variety of methods. For example, according to a first method, the fiber reinforcement may be impregnated by (i) applying a curable silicone composition to a release liner to form a silicone film; (ii) embedding a fiber reinforcement in the film; (iii) degassing the embedded fiber reinforcement; and (iv) applying the curable silicone composition to the degassed embedded fiber reinforcement to form an impregnated fiber reinforcement.

In step (i), a curable silicone composition, such as the first curable silicone composition or the second curable silicone composition described above, may be applied to a release liner to form a silicone film. The release liner can be any rigid or flexible material having a surface from which the reinforced silicone-resin film can be removed without damage by delamination after the silicone resin is cured, as described below. Examples of release liners include, but are not limited to, Nylon, polyethyleneterephthalate, and polyimide.

The curable silicone composition may be applied to the release liner using conventional coating techniques, such as spin coating, dipping, spraying, brushing, or screen-printing. The curable silicone composition is applied in an amount sufficient to embed the fiber reinforcement in step (ii), below.

In step (ii), a fiber reinforcement is embedded in the silicone film. The fiber reinforcement may be embedded in the silicone film by simply placing the reinforcement on the film and allowing the curable silicone composition of the film to saturate the reinforcement.

In step (iii), the embedded fiber reinforcement is degassed. The embedded fiber reinforcement can be degassed by subjecting it to a vacuum at a temperature of from room temperature (~23° C.±2° C.) to 60° C., for a period of time sufficient to remove entrapped air in the embedded reinforcement. For example, the embedded fiber reinforcement can typically be degassed by subjecting it to a pressure of from 1,000 Pa to 20,000 Pa for 5 minutes to 60 minutes at room temperature.

In step (iv), the curable silicone composition is applied to the degassed embedded fiber reinforcement to form an impregnated fiber reinforcement. The curable silicone composition may be applied to the degassed embedded fiber reinforcement using conventional methods, as described above for step (i).

The first method may further comprise the steps of (v) degassing the impregnated fiber reinforcement; (vi) applying a second release liner to the degassed impregnated fiber reinforcement to form an assembly; and (vii) compressing the assembly.

The assembly may be compressed to remove excess silicone composition, entrapped air, or both, and to reduce the thickness of the impregnated fiber reinforcement. The assembly can be compressed using conventional equipment such as a stainless steel roller, a hydraulic press, a rubber roller, or a laminating roll set. The assembly is typically compressed at a pressure of from 1,000 Pa to 10 MPa and at a temperature of from room temperature (~23° C.±2° C.) to 50° C.

Alternatively, according to a second method, the fiber reinforcement may be impregnated in a curable silicone composition by (i) depositing a fiber reinforcement on a release liner; (ii) embedding the fiber reinforcement in a curable silicone composition; (iii) degassing the embedded fiber reinforcement; and (iv) applying the curable silicone composition to the degassed embedded fiber reinforcement to form an impregnated fiber reinforcement. The second method may further comprise the steps of (v) degassing the impregnated fiber reinforcement; (vi) applying a second release liner to the degassed impregnated fiber reinforcement to form an assembly; and (vii) compressing the assembly. In the second method, steps (iii) to (vii) are as described above for the first method of impregnating a fiber reinforcement in a curable silicone composition.

In step (ii) of the second method, the fiber reinforcement is embedded in a curable silicone composition. The reinforcement may be embedded in the curable silicone composition by simply covering the reinforcement with the composition and allowing the composition to saturate the reinforcement.

Furthermore, when the fiber reinforcement is a woven or nonwoven fabric, the reinforcement may be impregnated in a curable silicone composition by passing the reinforcement through the composition. The fabric may be passed through the curable silicone composition at a rate of from 1 cm/s to 1,000 cm/s at room temperature (~23° C.±2° C.).

Thereupon, the impregnated fiber reinforcement may be heated at a temperature sufficient to cure the silicone resin. The impregnated fiber reinforcement may be heated at atmospheric, sub-atmospheric, or supra-atmospheric pressure. For example, the impregnated fiber reinforcement may be heated at a temperature of from room temperature (~23±2° C.) to 250° C., from room temperature to 200° C., or from room temperature to 150° C., at atmospheric pressure. The reinforcement is heated for a length of time sufficient to cure (cross-link) the silicone resin. For example, the impregnated fiber reinforcement may be heated at a temperature of from 150° C. to 200° C. for a time of from 0.1 hour to 3 hours.

Alternatively, the impregnated fiber reinforcement may be heated under vacuum at a temperature of from 100° C. to 200° C. and a pressure of from 1,000 Pa to 20,000 Pa for a time of from 0.5 hours to 3 hours. The impregnated fiber reinforcement may be heated under vacuum using a conventional vacuum bagging process. In an example vacuum bagging process, a bleeder such as polyester may be applied over the impregnated fiber reinforcement, a breather such as Nylon or polyester may be applied over the bleeder. A vacuum bagging film such as Nylon equipped with a vacuum nozzle may be applied over the breather. The vacuum bagging film may be sealed with tape. Then, a vacuum such as 1,000 Pa may be applied to the sealed bagging film, and the evacuated bag may be heated as described above.

The reinforced silicone resin film of the present invention may comprise from 10% to 99% (w/w), from 30% to 95% (w/w), from 60% to 95% (w/w), or from 70% to 95% (w/w), of the cured product of the curable silicone composition. Also, the reinforced silicone resin film may have a thickness of from 5 µm to 500 µm, 15 µm to 500 µm, from 15 µm to 300 µm, from 20 µm to 150 µm, or from 30 µm to 125 µm. The reinforced silicone resin film typically has a flexibility such that the film can be bent over a cylindrical steel mandrel having a diameter less than or equal to 3.2 mm without cracking, where the flexibility is determined as described in ASTM Standard D522-93a, Method B.

The reinforced silicone resin film has low coefficient of linear thermal expansion (CTE), high tensile strength, and high modulus. For example the film may have a CTE of from 0 to 80 µm/m° C., from 0 to 20 µm/m° C., or from 2 µm/m° C. to 10 µm/m° C., at temperature of from room temperature (~23 C±2° C.) to 200° C. Also, the film may have a tensile strength at 25° C. of from 50 MPa to 200 MPa, from 80 MPa to 200 MPa, or from 100 MPa to 200 MPa. Further, the reinforced silicone resin film may have a Young's modulus at 25° C. of from 2 GPa to 10 GPa, from 2 GPa to 6 GPa, or from 3 GPa to 5 GPa.

Further embodiments are directed to a laminated substrate comprising at least one fiber-reinforced free-standing phosphosiloxane-resin film, as described above, as a substrate. Embodiments of the laminated substrate comprise a first substrate, at least one additional substrate overlying the first substrate, and a silicone adhesive between all adjacent substrates. As used herein, the term "overlying" used in reference to the additional substrates means each additional substrate occupies a position over, but not necessarily in direct contact with, the first substrate and any intervening substrate(s). The silicone adhesive is provided on at least a portion of at least one surface of each substrate, such that at least a portion of the silicone adhesive is between facing surfaces of every two adjacent substrates and is in direct contact with said facing surfaces. The silicone adhesive comprises a cured product of at least one silicone resin.

The substrate may be any rigid or flexible material having a planar, complex, or irregular contour. The substrate may be transparent or nontransparent to light in the visible region (about 400 nm to about 700 nm) of the electromagnetic spectrum. Also, the substrate may be an electrical conductor, semiconductor, or nonconductor. Examples of substrates include, but are not limited to, semiconductors such as silicon, silicon carbide, indium phosphide, and gallium arsenide, the silicon optionally having a surface layer of silicon dioxide; quartz; fused quartz; aluminum oxide; ceramics; glass such as soda-lime glass, borosilicate glass, lead-alkali glass, borate glass, silica glass, aluminosilicate glass, lead-borate glass, sodium borosilicate glass, lithium aluminosilicate glass, chalcogenide glass, phosphate glass, and alkali-barium silicate glass; metal foils; polyolefins such as polyethylene, polypropylene, polystyrene, polyethylene terephthalate (PET), and polyethylene naphthalate; fluorocarbon polymers such as polytetrafluoroethylene and polyvinylfluoride; polyamides such as Nylon; polyimides; polyesters such as poly(methyl methacrylate); epoxy resins; polyethers; polycarbonates; polysulfones; and polyether sulfones.

The first substrate or at least one of the additional substrates, or the first substrate and at least one of the additional substrates, is a free-standing reinforced phosphosiloxane resin film according to any of the embodiments described above. In addition, one or more substrate may be any fiber-reinforced silicone-resin film prepared, for example, by impregnating a fiber reinforcement (e.g., woven or nonwoven glass fabric, or loose glass fibers) in a curable silicone composition comprising a silicone resin, and heating the impregnated fiber reinforcement to cure the silicone resin. Reinforced silicone resin films prepared from various types of curable silicone compositions are known in the art, as exemplified in the following International Patent Application Publications: WO 2006/088645, WO 2006/088646, WO 2007/092032, and WO 2007/018756.

As non-limiting examples, the laminated substrate may contains from 1 to 20 additional substrates, from 1 to 10 additional substrates, or from 1 to 4 additional substrates. It is contemplated that the laminated substrate may contain any number of additional substrates as practicable, including from 1 to 50 additional substrates, from 1 to 100 additional substrates, or even from 1 to 500 additional substrates. When the laminated substrate is a laminated glass substrate, at least one of the substrates is glass, one of the substrates is a reinforced free-standing phosphosiloxane-resin film as described above and, optionally, at least one of the substrates is a reinforced silicone-resin film.

The laminated substrate comprises a silicone adhesive coating on at least a portion of at least one surface of each substrate. The adhesive coating may be on a portion of one or more surfaces of each substrate or on all of one or more surfaces of each substrate. For example, when the laminated substrate is a laminated glass comprising glass panes, the silicone adhesive coating may be on one side, on both sides, or on both sides and the edges, of each pane.

The silicone adhesive may comprise any known or to be developed silicone adhesive. In some embodiments, the silicone adhesive may comprise a cured product of at least one silicone resin of formula (A1), as described and exemplified above with respect to the second curable silicone composition. In preferred embodiments, the silicone adhesive may comprise a cured product of at least one organohydrogenpolysiloxane of formula (B1), as described and exemplified above with respect to the first curable silicone composition.

In preferred embodiments, the silicone adhesive may have a high transparency. The transparency of the silicone adhesive may depend on a number of factors, such as the composition and thickness of the adhesive. For example, a silicone adhesive film having a thickness of 50 μm may have a transmittance of at least 80% or at least 90%, for light in the visible region (about 400 nm to about 700 nm) of the electromagnetic spectrum.

The silicone adhesive may be cured by exposing the silicone adhesive to a temperature of from room temperature (23±2° C.) to 250° C., from room temperature to 200° C., or from room temperature to 150° C., at atmospheric pressure. The silicone adhesive generally is heated for a length of time sufficient to cure (cross-link) the silicone resin or organohydrogenpolysiloxane in the silicone adhesive. For example, the composition may be heated at a temperature of from 150° C. to 200° C. for a time of from 0.1 hour to 3 hours.

The coated substrate comprises a silicone adhesive coating on at least a portion of a surface of the substrate. The silicone adhesive coating may be on a portion of one or more surfaces of the substrate or on all of one or more surfaces. For example, when the substrate is a flat panel, the silicone adhesive coating may be on one side, on both sides, or on both sides and the edges, of the substrate.

The silicone adhesive coating may be a single-layer coating comprising one layer of a silicone adhesive, or a multiple-layer coating comprising two or more layers of at least two different silicone adhesives, where directly adjacent layers comprise different silicone adhesives. When multiple-layer coatings are used with different silicone adhesives, the cured products of the different silicone adhesives may have a different compositional or physical properties that function together to make the simultaneous use of the different compositions particularly desirable. As non-limiting examples, the multiple-layer coating may comprise from 2 to 7, from 2 to 5, or from 2 to 3 individual layers of two or more types of silicone adhesive.

As non-limiting examples, the single-layer silicone adhesive coating may have a thickness of from 0.03 μm to 300 μm, from 0.1 μm to 100 μm, or from 0.1 μm to 50 μm. As non-limiting examples, the multiple-layer coating may have a thickness of from 0.06 μm to 300 μm, from 0.2 μm to 100 μm, or from 0.2 μm to 50 μm. When the thickness of any layer of the silicone-adhesive coating is less than about 0.03 μm, the silicone-adhesive coating may become discontinuous. When the thickness of any layer of the silicone-adhesive coating is greater than 300 μm, the silicone-adhesive coating may crack, exhibit reduced adhesion, or both.

Referring to FIG. 1, a first example embodiment of a laminated substrate is shown as a two-layer laminated substrate 1. The two-layer laminated substrate 1 comprises a first substrate 20 and a first additional substrate 30 overlying the first substrate 20. The first substrate 20 has a first-substrate first surface 22 and a first-substrate second surface 24, the first-substrate second surface 24 being opposite the first-substrate first surface 22. The first additional substrate 30 has a first-additional-substrate second surface 34 facing the first-substrate first surface 22 as first facing surfaces 51. A first-additional-substrate first surface 32 is opposite the first-additional-substrate second surface 34. At least one of the first substrate 20 and the first additional substrate 30 is derived from a free-standing reinforced phosphosiloxane resin film.

A first silicone-adhesive layer 25 is provided on at least a portion of the first-substrate first surface 22 and on at least a portion of the first-additional-substrate second surface 34, such that at least a portion of the first silicone-adhesive layer 25 is between the first-substrate first surface 22 and the first-additional-substrate second surface 34. The first facing surfaces 51 are in direct contact with the first silicone-adhesive layer 25. The first silicone-adhesive layer 25 comprises a cured product of at least one silicone resin, as defined above.

Though in the example embodiment of the two-layer laminated substrate 1, the first substrate 20 and the first additional substrate 30 have the substantially the same width, it will be readily apparent that the first substrate 20 and the first additional substrate 30 may have different widths. Furthermore, though the first silicone-adhesive layer 25 is shown as entirely covering the first-substrate first surface 22 and the first-additional-substrate second surface 34, it will be understood that only a portion of each of these surfaces need be covered in the laminated substrate.

Figure 2:
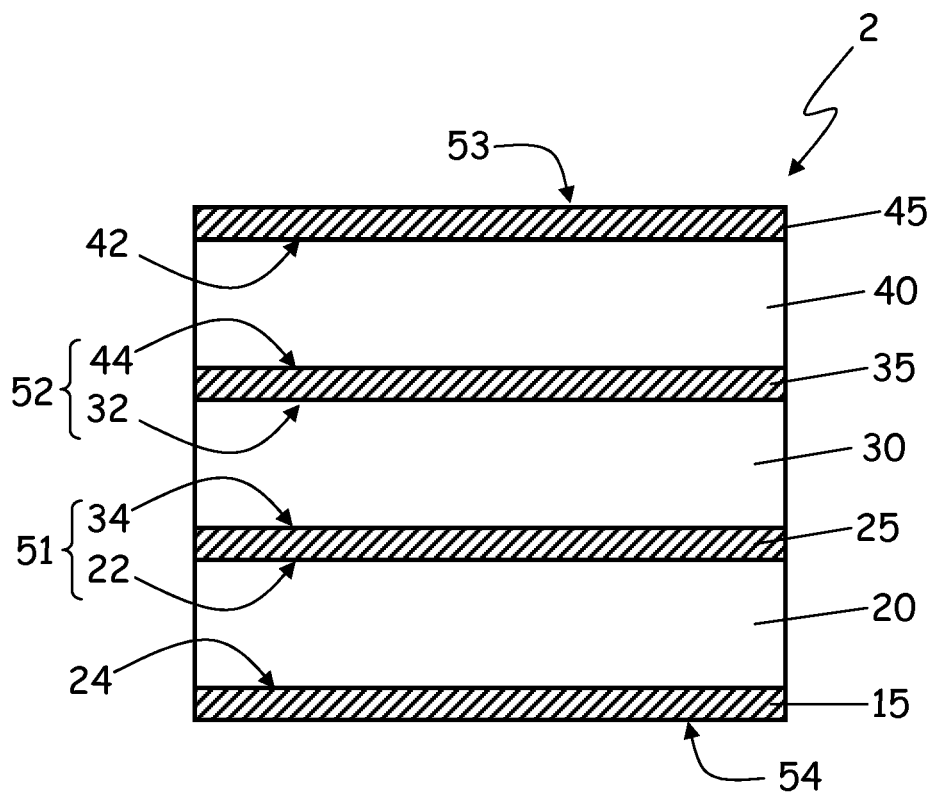
FIG. 2 shows a cross-sectional view of the embodiment of the laminated substrate shown in FIG. 1, further comprising a second additional substrate and silicone adhesive coatings on the bottom of the first substrate and on the top of the second additional substrate.

Referring to FIG. 2, an adhesive-coated three-layer laminated substrate 2 is shown as a second example embodiment of a laminated substrate. The adhesive-coated three-layer laminated substrate 2 comprises a first substrate 20, a first additional substrate 30, and a second additional substrate 40. The first substrate 20 and the first additional substrate 30 are adjacent substrates. Likewise, the first additional substrate and the second additional substrate 40 are adjacent substrates. First facing-surfaces 51 comprise a first-substrate first surface 22 and a first-additional-substrate second surface 34. Second facing-surfaces 52 comprise first-additional-substrate first surface 32 and second-additional-substrate second surface 44. A second-additional-substrate first surface 42 is opposite the second-additional-substrate second surface 44. At least one of the first substrate 20, the first additional substrate 30, and the second additional substrate 40 is derived from a free-standing reinforced phosphosiloxane resin film.

A first silicone-adhesive layer 25 is provided between, and in direct contact with, each of the first facing-surfaces 51. A second silicone-adhesive layer 35 is provided between, and in direct contact with, each of the second facing-surfaces 52. As such, a silicone adhesive is provided on at least a portion of at least one surface of each substrate, such that at least a portion of the silicone adhesive is between facing surfaces of every two adjacent substrates and is in direct contact with the facing surfaces. Additionally, in adhesive-coated three-layer laminated substrate 2, a bottom adhesive layer 15 is provided on first-substrate second surface 24, and a top adhesive layer 45 is provided on second-additional-substrate first surface 42. The bottom adhesive layer 15 and the top adhesive layer 45 may be used to attach further additional substrates, or even further laminated substrates having a plurality of individual substrates, to laminate-top surface 47, laminate-bottom surface 13, or both. Each of the first silicone-adhesive layer 25, the second silicone-adhesive layer 35, the top adhesive layer 45, and the bottom adhesive layer 15 comprises a cured product of at least one silicone resin, as defined above.

A suitable method of preparing the laminated substrate is illustrated here for the two-layer laminated substrate 1 depicted in FIG. 1. The two-layer laminated substrate 1 can be prepared by (i) applying a curable silicone composition, described above, on a first surface of a first substrate to form a first adhesive film; (ii) applying a first additional substrate on the first adhesive film; and (iii) curing the curable silicone composition of the first adhesive film. The curable silicone composition may be applied on the substrate using conventional methods such as spin coating, dip coating, spray coating, flow coating, screen printing, and roll coating. When present, the solvent may be allowed to evaporate from the coated substrate before the film is heated. Any suitable means for evaporation may be used such as simple air drying, applying a vacuum, or heating (up to 50° C.). Laminated substrates comprising additional silicone adhesive coatings and substrates may be prepared in a similar manner, such as by applying an additional adhesive film on the first additional substrate, applying a second additional substrate on the additional adhesive film, and curing the curable silicone composition of the additional adhesive film. When the laminated substrate comprises at least one multiple-layer silicone-adhesive coating, each layer of the multiple-layer silicone-adhesive coating may be at least partially cured before the next layer of silicone adhesive is applied.

EXAMPLES

Reference is made to the following examples, which are offered by way of illustration and which one of skill in the art will recognize are not meant to be limiting.

Preparative Example 1

Preparation of vinyl bis(vinyldimethylsilyl)phosphonate

A 250-mL round-bottom, three-necked flask was equipped with a stirrer, a Dean-Stark trap, a condenser, and a thermometer, and was blanketed with nitrogen gas. To the flask were added 29 g of vinylphosphonic acid and 125 g of 1,1,3,3-tetramethyl-1,3-divinyldisiloxane. The flask was heated while the mixture was stirred. When the temperature reached 115° C., water began to condense under the condenser. The condensing water was collected in the Dean-Stark trap. Then, the temperature was further increased to 143° C. to maintain a reflux as the condensing water continued to be collected. Reflux was maintained for 47 hours, after which duration 7.7 g of water had collected on the bottom of the Dean-Stark trap. The heating then was stopped, the reaction mixture in the flask was transferred into a one-neck round-bottom flask, and the one-neck round-bottom flask was placed on a rotary evaporator. Unreacted tetramethyl divinyldisiloxane was removed at 5 mmHg and 85° C. for 1.5 hours. A slightly yellow, transparent, low-viscosity liquid was obtained. $^{29}$Si NMR showed a single sharp peak at 8.004 ppm with a very small shoulder at roughly 8.4 ppm, consistent with predominantly ViP(O)(OSiMe$_2$Vi)$_2$ and a very small amount of impurity ViP(O)(OH)(OSiMe$_2$Vi), (Vi=vinyl group). $^{31}$P NMR showed predominantly a single sharp peak at about –0.6 ppm with an additional very small peak at 11.4 ppm, consistent with $^{29}$Si NMR results.

Preparative Example 2

Preparation of phenyl bis(vinyldimethylsilyl)phosphonate

Following a procedure analogous to that of Preparative Example 1, 20 g of phenylphosphonic acid and 94.2 g of tetramethyldivinyldisiloxane were added into the three-neck round-bottom flask. A product was obtained with a final yield of 99.5%. $^{29}$Si in combination of GC-MS confirmed that the product was 99% Ph-P(O)(OSiMe$_2$Vi)$_2$. with a final yield was 99.5%.

Preparative Example 3

Preparation of Films

Base materials used for the formulations described below were as follows:
RESIN: a silicone resin having an average composition of (PhSiO$_{3/2}$)$_{0.75}$(ViMe$_2$SiO$_{1/2}$)$_{0.25}$, in toluene as a 79.5 wt. % solution;
CROSSLINKER (organosilicon compound): phenyltris(dimethylsiloxy)silane;
PHOSPHONATE A: vinyl bis(vinyldimethylsilyl)phosphonate prepared according to Preparative Example 1;
PHOSPHONATE B: phenyl bis(vinyldimethylsilyl)phosphonate prepared according to Preparative Example 2;
CATALYST A: a complex of platinum with tetramethyldivinyldisiloxane, diluted in toluene to a platinum concentration of 1000 ppm by weight; and
CATALYST B: the complex described as CATALYST A, to which was added four moles of triphenylphosphine for each mole of platinum in the complex.

Formulations were prepared by mixing on a Hauschild mixer a desired amount of RESIN, CROSSLINKER, PHOSPHONATE A or PHOSPHONATE B, CATALYST A or CATALYST B, and toluene solvent. A saturation trough 15 cm wide was constructed and included a stainless-steel bar. Style 106 glass fabric (BGF Industrial, Inc.) was cut into pieces having widths matching the width of the saturation trough and lengths of approximately 300 cm. The glass-fabric pieces were heat-treated in an air furnace at 600° C. for 15 minutes to remove processing remnants (surface sizing) from the glass fibers. One end of each heat-treated glass-fabric piece was adhered to a wooden stick using fiber-reinforced tape, and the adhered glass-fabric pieces were placed one at a time into the saturation trough underneath the stainless steel bar.

The formulations were poured into the saturation trough so that the liquid level was higher than the stainless steel bar. Individual glass-fabric piece were pulled through the formulation in the saturation trough under the stainless-steel bar. The amount of resin solution taken up by the fabric was controlled by the concentration of the solution, and the concentration was adjusted by adding a desired amount of toluene. The saturated glass fabric was then vertically hung in a ventilated hood to dry overnight. After the drying process, the resin-saturated glass fabric was cured in an air-ventilated oven at 150° C. for 1 hour.

Examples 1 To 7

Examples 1 to 7 were prepared according to the procedure described above in Preparative Example 3 to determine the relationship of LOI values with respect to the components of various formulations. Example 7 was prepared as a comparative example, in that the formulation of Example 7 lacked a phosphonate component. The formulation components are provided in TABLE 1, with numerical values representing the number of grams of each component added to the respective formulation.

formulation, as compared to the formulation of Example 7 without a phosphonate compound. With particular reference to Examples 1, 3, and 7, it was noted that for three formulations having essentially equal amounts of crosslinker and catalyst, the LOI values increased as the amount of phosphonate was increased. Comparison of Example 1 with Example 2 and of Example 3 with Example 4 showed a less significant effect on LOI when the amount of crosslinker was increased but the amount of PHOSPHONATE A was held essentially constant. Examples 5 and 6 were consistent with this observation in formulations comprising PHOSPHONATE B. Examples 3 and 4, as compared with Examples 5 and 6, respectively, showed a higher increase of LOI for formulations comprising PHOSPHONATE A (vinyl), as opposed to PHOSPHONATE B (phenyl).

TABLE 1

Formulations prepared according to Preparative Example 3

|  | RESIN | CROSSLINKER | PHOSPHONATE A | PHOSPHONATE B | CATALYST A | CATALYST B | Toluene |
|---|---|---|---|---|---|---|---|
| Example 1 | 25 | 4.555 | 1.221 | 0.000 | 0.244 | 0.000 | 5.8 |
| Example 2 | 25 | 5.428 | 1.265 | 0.000 | 0.253 | 0.000 | 4.8 |
| Example 3 | 25 | 4.555 | 2.443 | 0.000 | 0.244 | 0.000 | 4.5 |
| Example 4 | 25 | 6.363 | 2.624 | 0.000 | 0.262 | 0.000 | 2.5 |
| Example 5 | 22 | 5.117 | 0.000 | 2.414 | 0.121 | 0.000 | 3.0 |
| Example 6 | 24 | 5.583 | 0.000 | 2.634 | 0.132 | 0.000 | 0.3 |
| Example 7 (comparative) | 25 | 4.555 | 0.000 | 0.000 | 0.000 | 0.244 | 7.0 |

Glass fabrics were saturated in each of the formulations listed in TABLE 1 and were cured according to the procedure described in Preparative Example 3. The resin content of the film was determined by cutting a 3 cm by 3 cm square-shaped piece of the film and weighing it, then calculating using the weight of the film and the weight of the reinforcing fabric. The resin weight was determined by subtracting the weight of fabric from the total weight of the film. Resin content was the resin weight expressed as a percentage of the total weight of the film.

Limiting Oxygen Index was measured according to ASTM standard D2863-06a. LOI values correspond to the oxygen percentage of a $O_2/N_2$ atmosphere in which the films are capable of maintaining a candle-like small flame. The higher the value, the more concentrated an oxygen containing environment is needed to maintain slow burning of a material. Therefore, a higher LOI value corresponds to a lower flammability of the film material. If a material has an LOI value equal to or slightly higher than the typical oxygen concentration of air, i.e., about 21% to 28%, the material usually is considered to be a slow-burning material. Materials having LOI values from 28% to 30% or higher are considered to be self-extinguishing, because the typical oxygen content of air would be insufficient to enable the material to sustain a flame. The resulting LOI data are provided in TABLE 2:

TABLE 2

Limiting Oxygen Index of glass fabrics saturated with the example formulations and cured

| Formulation | Resin Content | LOI | LOI vs. Example 7 |
|---|---|---|---|
| Example 1 | 53.978% | 27.4 | 1.12 |
| Example 2 | 54.087% | 25.9 | 1.06 |
| Example 3 | 54.093% | 29.4 | 1.20 |
| Example 4 | 54.082% | 31.0 | 1.27 |
| Example 5 | 50.533% | 26.0 | 1.06 |
| Example 6 | 55.133% | 27.5 | 1.12 |
| Example 7 (comparative) | 54.010% | 24.5 | 1.00 |

Examples 1-6 consistently demonstrated an increase in LOI through the addition of a phosphonate compound to the

What is claimed is:

1. A phosphosiloxane resin comprising a plurality of covalently bonded structural units, each covalently bonded structural unit being selected from the group consisting of:
a phosphosiloxane unit having formula (I)

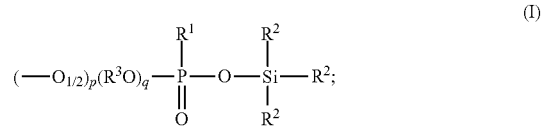

and
an organosiloxane unit having formula (II)

where
$R^1$ and each $R^2$ are independently selected from the group consisting of hydrogen, $C_1$ to $C_{10}$ hydrocarbyl, and $C_1$ to $C_{10}$ hydrocarbylene;
each $R^3$ is independently selected from the group consisting of hydrogen and $C_1$ to $C_{10}$ hydrocarbyl;
p is 0 or 1;
q=1−p;
m is 0, 1, 2, 3, or 4;
n is 0, 1, or 2; and
m+n is 0, 1, 2, 3, or 4,
such that
at least 0.001 mol. % of the covalently bonded monomer units are phosphosiloxane units;
in each phosphosiloxane unit having q=1, at least one group $R^1$ or $R^2$ is $C_1$ to $C_{10}$ hydrocarbylene;
m has an average value of from 0.0001 to 3.95 over all of the organosiloxane units present in the phosphosiloxane resin;

m+n has an average value of from 0.0001 to 3.95 over all of the organosiloxane units present in the phosphosiloxane resin; and at least one group $R^2$ is $C_1$ to $C_{10}$ hydrocarbylene.

2. The phosphosiloxane resin of claim 1, wherein:
from 0.001 mol. % to 75 mol. % of the covalently bonded structural units are phosphosiloxane units; and
from 25 mol. % to 99.999 mol. % of the covalently bonded structural units are organosiloxane units.

3. The phosphosiloxane resin of claim 1, wherein:
less than 75 mol. % of all groups $R^1$ and $R^2$ in the phosphosiloxane resin are hydrogen; and/or
less than 25 mol. % of all phosphosiloxane units have q=1; and/or
less than 5 mol. % of all organosiloxane units have n >0.

4. The phosphosiloxane resin of claim 1, wherein an average of at least one group $R^1$ or $R^2$ per molecule of the phosphosiloxane resin is an alkenyl group or wherein an average of greater than one group $R^1$ or $R^2$ per molecule of the phosphosiloxane resin are alkenyl groups.

5. The phosphosiloxane resin of claim 1, wherein at least 25 mol. % of all groups $R^1$ and $R^2$ in the phosphosiloxane resin are alkenyl groups or wherein at least 25 mol. % of all groups $R^1$ and $R^2$ in the phosphosiloxane resin are terminal alkenyl groups or wherein at least 25 mol. % of all groups $R^1$ and $R^2$ in the phosphosiloxane resin are selected from the group consisting of vinyl, allyl, 5-pentenyl, and 6-hexenyl.

6. The phosphosiloxane resin of claim 1, wherein:
at least 25 mol. % of all groups $R^1$ and $R^2$ in the phosphosiloxane resin are vinyl groups;
from 5 mol. % to 75 mol. % of all groups $R^1$ in the phosphosiloxane resin are hydrogen; and
each $R^3$ is independently selected from the group consisting of hydrogen, methyl, vinyl, or phenyl.

7. The phosphosiloxane resin of claim 1, wherein:
each $R^1$ and each $R^2$ is independently selected from the group consisting of methyl, ethyl, propyl, butyl, pentyl, hexyl, vinyl, and phenyl, except that at least 25 mol. % of all groups $R^1$ and $R^2$ in the phosphosiloxane resin are vinyl and from 5 mol. % to 75 mol. % of all groups $R^1$ are hydrogen; and
each $R^3$ is independently selected from the group consisting of hydrogen, methyl, ethyl, propyl, and phenyl.

8. The phosphosiloxane resin of claim 1, wherein a plurality of pairs of covalently bonded monomer units are joined so as to form organically bridged disilyl linkages having formula (III):

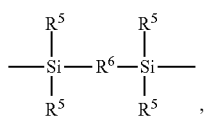

(III)

where
each $R^5$ is an aliphatically saturated $C_1$ to $C_{10}$ hydrocarbyl, and
each $R^6$ is a $C_1$ to $C_{10}$ hydrocarbylene or where
each $R^5$ is independently selected from the group consisting of methyl, ethyl, propyl, phenyl, and tent-butyl; and
each $R^6$ is independently selected from the group consisting of methylene, ethylene, 1,3-propylene, butylenes, pentylenes, 1,2-phenylene, 1,3-phenylene, and 1,4-phenylene.

9. A curable silicone composition comprising:
(A) at least one phosphosiloxane resin according to claim 1, wherein an average of greater than one group $R^1$ or $R^2$ per molecule are alkenyl groups;
(B) at least one organosilicon compound having per molecule an average of at least two silicon-bonded hydrogen atoms; and
(C) a catalytic amount of a hydrosilylation catalyst.

10. The curable silicone composition of claim 9, wherein the at least one organosilicon compound is an organohydrogenpolysiloxane resin having formula (B1):

$$(Q^1Q^4{}_2SiO_{1/2})_w(Q^4{}_2SiO_{2/2})_x(Q^1SiO_{3/2})_y(SiO_{4/2})_z \qquad (B1),$$

where
$Q^1$ is an aliphatically saturated $C_1$ to $C_{10}$ hydrocarbyl or an aliphatically saturated $C_1$ to $C_{10}$ halohydrocarbyl;
$Q^4$ is $Q^1$ or an organosilylalkyl group having at least one silicon-bonded hydrogen atom;
w is from 0 to 0.8;
x is from 0 to 0.6;
y is from 0 to 0.99;
z is from 0 to 0.35;
w+x+y+z=1;
y+z/(w+x+y+z) is from 0.2 to 0.99; and
w+x/(w+x+y+z) is from 0.01 to 0.8,
wherein at least 50 mol % of the groups $Q^4$ are organosilylalkyl.

11. The curable silicone composition of claim 9, wherein the organosilicon compound is an organohydrogensilane of the formula $HQ^1{}_2Si\text{-}Q^3\text{-}SiQ^1{}_2H$, where
$Q^1$ is an aliphatically saturated $C_1$ to $C_{10}$ hydrocarbyl or an aliphatically saturated $C_1$ to $C_{10}$ halohydrocarbyl, and
$Q^3$ is an aliphatically saturated hydrocarbylene group selected from the group consisting of:

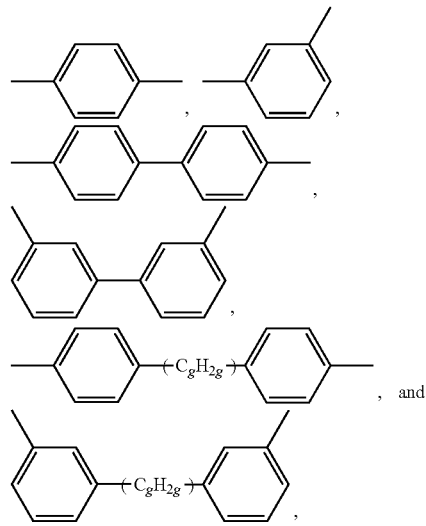

where g is from 1 to 6.

12. The curable silicone composition of claim 9, wherein the at least one organosilicon compound is selected from the group consisting of:
diphenylsilane;
2-chloroethylsilane;
bis[(p-dimethylsilyl)phenyl]ether;
,2-bis(dimethylsilyl)ethane;
1,4-bis(dimethylsilyl)benzene;
1,3,5-tris(dimethylsilyl)benzene;

1,3,5-trimethyl-1,3,5-trisilane;
poly(methylsilylene)phenylene; and
poly(methylsilylene)methylene.

13. A free-standing reinforced phosphosiloxane resin film comprising:
- a cured product of a curable silicone composition according to claim 9; and
- a fiber reinforcement dispersed in the cured product, wherein the free-standing reinforced phosphosiloxane resin film has a thickness of from about 5 µm to 500 µm.

14. A laminated substrate comprising:
- a first substrate;
- at least one additional substrate overlying the first substrate; and
- a silicone adhesive provided on at least a portion of at least one surface of each substrate, such that at least a portion of the silicone adhesive is between opposing surfaces of every two adjacent substrates and is in direct contact with the opposing surfaces of the adjacent substrates, the silicone adhesive comprising a cured product of at least one silicone resin,
- wherein at least one of the substrates is a free-standing reinforced phosphosiloxane-resin film according to claim 13.

* * * * *